US012412586B2

(12) United States Patent
Ghido et al.

(10) Patent No.: US 12,412,586 B2
(45) Date of Patent: *Sep. 9, 2025

(54) METHOD FOR DECODING AND ENCODING A DOWNMIX MATRIX, METHOD FOR PRESENTING AUDIO CONTENT, ENCODER AND DECODER FOR A DOWNMIX MATRIX, AUDIO ENCODER AND AUDIO DECODER

(71) Applicant: Fraunhofer-Gesellschaft zur Foerderung der angewandten Forschung e.V., Munich (DE)

(72) Inventors: Florin Ghido, Nuremberg (DE); Achim Kuntz, Hemhofen (DE); Bernhard Grill, Lauf (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,072

(22) Filed: Feb. 12, 2024

(65) Prior Publication Data

US 2024/0304193 A1 Sep. 12, 2024

Related U.S. Application Data

(63) Continuation of application No. 17/807,095, filed on Jun. 15, 2022, now Pat. No. 11,922,957, which is a (Continued)

(30) Foreign Application Priority Data

Oct. 22, 2013 (DE) ................................ 13189770.4

(51) Int. Cl.
*G10L 19/008* (2013.01)
*G10L 19/005* (2013.01)
(Continued)

(52) U.S. Cl.
CPC ................................ *G10L 19/008* (2013.01)

(58) Field of Classification Search
CPC ....... G10L 19/00; G10L 19/08; G10L 19/008; G10L 19/005; G10L 19/02; G10L 19/083;
(Continued)

(56) References Cited

U.S. PATENT DOCUMENTS 6,108,633 A 8/2000 Kolluru
6,522,270 B1 2/2003 O'Neill
(Continued)

FOREIGN PATENT DOCUMENTS

CN 101460997 A 6/2009
CN 101506875 A 8/2009
(Continued)

OTHER PUBLICATIONS

International Standard ISO/IEC 23008-3:2015(E), Information technology—High efficiency coding and media delivery in heterogeneous environments—Part 3: 3D audio, 438 pages (Year: 2015).*
(Continued)

*Primary Examiner* — Leshui Zhang
(74) *Attorney, Agent, or Firm* — Haynes and Boone, LLP

(57) ABSTRACT

A method is described which decodes a downmix matrix for mapping a plurality of input channels of audio content to a plurality of output channels, the input and output channels being associated with respective speakers at predetermined positions relative to a listener position, wherein the downmix matrix is encoded by exploiting the symmetry of speaker pairs of the plurality of input channels and the symmetry of speaker pairs of the plurality of output channels. Encoded information representing the encoded downmix matrix is received and decoded for obtaining the decoded downmix matrix.

13 Claims, 9 Drawing Sheets

Related U.S. Application Data continuation of application No. 16/579,293, filed on Sep. 23, 2019, now Pat. No. 11,393,481, which is a continuation of application No. 15/911,974, filed on Mar. 5, 2018, now Pat. No. 10,468,038, which is a continuation of application No. 15/131,263, filed on Apr. 18, 2016, now Pat. No. 9,947,326, which is a continuation of application No. PCT/EP2014/071929, filed on Oct. 13, 2014.

(51) Int. Cl.

| | |
|---|---|
| ***G10L 19/02*** | (2013.01) |
| ***G10L 19/022*** | (2013.01) |
| ***G10L 19/025*** | (2013.01) |
| ***G10L 19/028*** | (2013.01) |
| ***G10L 19/083*** | (2013.01) |
| ***G10L 19/20*** | (2013.01) |

(58) Field of Classification Search

CPC . G10L 19/20; G10L 19/0204; G10L 19/0212; G10L 19/022; G10L 19/025; G10L 19/028; G10L 19/167; G10L 19/0017; G10L 19/0018; G10L 19/002; G10L 19/04; G10L 19/173; G10L 19/18; G10L 19/22; G10L 19/24; H04S 3/02; H04S 3/002; H04S 3/00; H04S 5/005; H04S 5/02; H04S 2400/05; H04S 2400/01; H04S 2400/15; H03M 7/00; G11B 20/00007; G11B 2020/10546; G11B 27/022; G11B 27/105

USPC .................................. 381/1–23; 704/500–504

See application file for complete search history.

(56) References Cited

U.S. PATENT DOCUMENTS

| | | | | |
|---|---|---|---|---|
| 6,697,491 | B1 * | 2/2004 | Griesinger | H04S 3/02 381/20 |
| 7,733,245 | B2 * | 6/2010 | Spencer | H04B 3/546 341/51 |
| 7,787,631 | B2 | 8/2010 | Faller | |
| 8,000,485 | B2 | 8/2011 | Walsh et al. | |
| 8,280,744 | B2 | 10/2012 | Hellmuth et al. | |
| 8,407,060 | B2 | 3/2013 | Hellmuth et al. | |
| 8,538,766 | B2 | 9/2013 | Hellmuth et al. | |
| 8,855,320 | B2 | 10/2014 | Disch et al. | |
| 9,595,267 | B2 * | 3/2017 | Oh | G10L 19/008 |
| 2004/0062401 | A1 | 4/2004 | Davis | |
| 2005/0074127 | A1 | 4/2005 | Herre et al. | |
| 2006/0085200 | A1 | 4/2006 | Allamanche et al. | |
| 2006/0153408 | A1 | 7/2006 | Faller | |
| 2006/0239473 | A1 | 10/2006 | Kiorling et al. | |
| 2007/0008193 | A1 | 1/2007 | Liebchen | |
| 2007/0081597 | A1 | 4/2007 | Disch et al. | |
| 2007/0121954 | A1 * | 5/2007 | Kim | G10L 19/008 381/22 |
| 2007/0194952 | A1 * | 8/2007 | Breebaart | G10L 19/008 341/50 |
| 2007/0233293 | A1 * | 10/2007 | Villemoes | H04S 3/00 700/94 |
| 2007/0271095 | A1 | 11/2007 | Miyasaka et al. | |
| 2007/0280485 | A1 * | 12/2007 | Villemoes | H04S 7/30 381/119 |
| 2008/0031463 | A1 * | 2/2008 | Davis | G10L 19/008 381/17 |
| 2008/0097750 | A1 | 4/2008 | Seefeldt et al. | |
| 2008/0126104 | A1 | 5/2008 | Seefeldt et al. | |
| 2008/0201153 | A1 | 8/2008 | Breebaart et al. | |
| 2008/0205657 | A1 | 8/2008 | Oh et al. | |
| 2009/0080666 | A1 | 3/2009 | Uhle et al. | |
| 2009/0125313 | A1 * | 5/2009 | Hellmuth | G10L 19/008 704/501 |
| 2009/0144063 | A1 * | 6/2009 | Beack | G10L 19/008 704/500 |
| 2009/0210238 | A1 | 8/2009 | Kim et al. | |
| 2009/0274308 | A1 | 11/2009 | Oh et al. | |
| 2009/0299756 | A1 * | 12/2009 | Davis | G10L 19/008 704/500 |
| 2009/0326959 | A1 | 12/2009 | Herre et al. | |
| 2010/0030563 | A1 | 2/2010 | Uhle et al. | |
| 2010/0083344 | A1 | 4/2010 | Schildbach et al. | |
| 2010/0094631 | A1 | 4/2010 | Engdegard et al. | |
| 2010/0121647 | A1 * | 5/2010 | Beack | G10L 19/008 704/500 |
| 2010/0153097 | A1 * | 6/2010 | Hotho | G10L 19/008 704/201 |
| 2010/0246832 | A1 | 9/2010 | Villemoes et al. | |
| 2010/0284549 | A1 | 11/2010 | Oh et al. | |
| 2010/0303246 | A1 | 12/2010 | Walsh et al. | |
| 2011/0013790 | A1 | 1/2011 | Hilpert et al. | |
| 2011/0022402 | A1 | 1/2011 | Engdegard et al. | |
| 2011/0091046 | A1 * | 4/2011 | Villemoes | G10L 19/008 381/22 |
| 2011/0200196 | A1 | 8/2011 | Disch et al. | |
| 2011/0264456 | A1 | 10/2011 | Koppens et al. | |
| 2012/0002818 | A1 | 1/2012 | Heiko et al. | |
| 2012/0057715 | A1 * | 3/2012 | Johnston | G10L 19/008 381/63 |
| 2012/0177204 | A1 * | 7/2012 | Hellmuth | G10L 19/008 381/22 |
| 2012/0314876 | A1 | 12/2012 | Vilkamo et al. | |
| 2013/0304480 | A1 | 11/2013 | Kuntz et al. | |
| 2014/0023197 | A1 | 1/2014 | Xiang | |
| 2014/0025386 | A1 | 1/2014 | Xuang et al. | |
| 2014/0233762 | A1 | 8/2014 | Vilkamo et al. | |
| 2014/0372130 | A1 | 12/2014 | Yoo | |
| 2015/0146873 | A1 | 5/2015 | Chabanne et al. | |
| 2016/0005406 | A1 | 1/2016 | Yen et al. | |
| 2016/0035357 | A1 | 2/2016 | Vasilache et al. | |

FOREIGN PATENT DOCUMENTS

| | | | |
|---|---|---|---|
| CN | 102171755 | A | 8/2011 |
| CN | 102209988 | A | 10/2011 |
| CN | 102597987 | A | 7/2012 |
| CN | 105723453 | B | 6/2016 |
| CN | 101842834 | A | 9/2020 |
| DE | 602005002451 | T2 | 6/2008 |
| EP | 1649723 | A1 | 4/2006 |
| JP | 2008519301 | | 6/2008 |
| RU | 2452043 | C2 | 11/2011 |
| WO | 2005101370 | A1 | 10/2005 |
| WO | 2009049895 | A1 | 4/2009 |
| WO | 2011102967 | A1 | 8/2011 |
| WO | 2012125855 | A1 | 9/2012 |
| WO | 2012177067 | A2 | 12/2012 |
| WO | 2013103175 | A1 | 7/2013 |

OTHER PUBLICATIONS

International Standard ISO/IEC 23003-3:2012, Information technology—MPEG audio technologies—Part 3: Unified Speech and Audio Coding, 2012 (286 pages).

ITU-R Report BS.2159-4, "Multichannel sound technology in home and broadcasting applications", 2012 (54 pages).

ITU-R BS.775-3, "Multichannel stereophonic sound system with and without accompanying picture," Rec., International Telecommunications Union, Geneva, Switzerland, 2012 (25 pages).

Office Action dated Apr. 13, 2017 issued in parallel Korean Patent App. No. 10-2016-7013337 (7 pages).

ISO/IEC FDIS 23003-1:2006(E). Information technology—MPEG audio technologies Part 1: MPEG Surround. ISO/IEC JTC 1/SC 29/WG 11. Jul. 21, 2006.

ATSC Standard: Digital Audio Compression (AC-3). Advanced Television Systems Committee. Doc. A/52:2012. Dec. 17, 2012.

Office Action dated Aug. 22, 2017 issued in parallel Japanese Patent App. No. JP2016-525036 (3 pages).

(56) References Cited

OTHER PUBLICATIONS

Office Action dated Sep. 1, 2017 issued in parallel Russian Patent App. No. 2016119546 (14 pages).
K. Hamasaki et al. "A 22.2 Multichannel Sound System for Ultrahigh-definition TV (UHDTV)," SMPTE Motion Imaging J., XP055095219, White Plains, pp. 40-49, 2008.
Akio Ando: "Conversion of Multichannel Sound Signal Maintaining Physical Properties of Sound in Reproduced Sound Field", IEEE Transactions On Audio, Speech And Language Processing, IEEE Service Center, New York, NY, USA, vol. 19, No. 6, Aug. 1, 2011 (Aug. 1, 2011), pp. 1467-1475.
K. Hamasaki et al.: 11 The 22.2 Multichannel Sound and its Reproduction at Home and Personal Environment 11, Conference: 43rd International Conference: Audio For Wirelessly Networked Personal Devices; Sep. 2011, AES, 60 East 42nd Street, Room 2520 New York 10165-2520, USA, Sep. 29, 2011 (Sep. 29, 2011), XP040567678.
Office Action dated Nov. 29, 2022 issued in parallel Chinese patent application No. 201910973920.4 (24 pages).
"Information Technology—Coding of Audio-Visual Objects—Part 3: Audio, Amendment 4: New Levels for AAC Profiles," ISO/IEC 14496-3:2009/DAM4; Jan. 25, 2013 (26 pages).
"Information Technology—MPEG Systems Technologies—Part 8: Coding-Independent Code Points," ISO/IEC 23001-8; First Edition Jul. 1, 2013 (28 pages).
David Singer, "14496-12 PDAM 3—Enhanced Audio and Other Improvements," ISO/ICE JTC1/SC29/WG11 Coding of Moving Pictures and Audio, Incheon, Korea, Apr. 21, 2016 (13 pages).
Office Action dated Mar. 12, 2019 issued in the parallel Chinese patent application No. 201480057957.8 (15 pages with English translation).
Office Action dated May 17, 2022 issued in the parallel Indian patent application No. 202138045996 (6 pages).
Office Action dated Jun. 1, 2020 issued in the parallel Brazilian patent application No. BR112016008787-9 (4 pages).
Office Action dated May 17, 2022 issued in the parallel Indian patent application No. 202138045999 (6 pages).

* cited by examiner

300

304

| | | | | | | |
|---|---|---|---|---|---|---|
| 1 | | | | | | C |
| 0.7 | 0.7 | | | | | Lc |
| 0.7 | | 0.7 | | | | Rc |
| | 1 | | | | | L |
| | | 1 | | | | R |
| | 0.7 | | 0.7 | | | Lss |
| | | 0.7 | | 0.7 | | Rss |
| | | | 1 | | | Lsr |
| | | | | 1 | | Rsr |
| | | | 0.7 | 0.7 | | Cs |
| | | | | | 0.7 | LFE |
| | | | | | 0.7 | LFE2 |
| 1 | | | | | | Cv |
| | 1 | | | | | Lv |
| | | 1 | | | | Rv |
| | 0.7 | | 0.7 | | | Lvss |
| | | 0.7 | | 0.7 | | Rvss |
| 0.7 | | | 0.5 | 0.5 | | Ts |
| | | | 1 | | | Lvr |
| | | | | 1 | | Rvr |
| | | | 0.7 | 0.7 | | Cvr |
| 1 | | | | | | Cb |
| | 1 | | | | | Lb |
| | | 1 | | | | Rb |
| C | L | R | Ls | Rs | LFE | |

302

FIG 4

306 304 300

| | | | | | | | |
|---|---|---|---|---|---|---|---|
| 1 | | | | | | C | $C_1$ |
| 0.7 | 0.7 | | | | | Lc | $S_1$ |
| 0.7 | | 0.7 | | | | Rc | |
| | 1 | | | | | L | $S_2$ |
| | | 1 | | | | R | |
| | 0.7 | | 0.7 | | | Lss | $S_3$ |
| | | 0.7 | | 0.7 | | Rss | |
| | | | 1 | | | Lsr | $S_4$ |
| | | | | 1 | | Rsr | |
| | | | 0.7 | 0.7 | | Cs | $C_2$ |
| | | | | | 0.7 | LFE | $S_5$ |
| | | | | | 0.7 | LFE2 | |
| 1 | | | | | | Cv | $C_3$ |
| | 1 | | | | | Lv | $S_6$ |
| | | 1 | | | | Rv | |
| | 0.7 | | 0.7 | | | Lvss | $S_7$ |
| | | 0.7 | | 0.7 | | Rvss | |
| 0.7 | | | 0.5 | 0.5 | | Ts | $C_4$ |
| | | | 1 | | | Lvr | $S_8$ |
| | | | | 1 | | Rvr | |
| | | | 0.7 | 0.7 | | Cvr | $C_5$ |
| 1 | | | | | | Cb | $C_6$ |
| | 1 | | | | | Lb | $S_9$ |
| | | 1 | | | | Rb | |
| C | L | R | Ls | Rs | LFE | | |
| $C_7$ | $S_{10}$ | | $S_{11}$ | | $A_1$ | | |

302

FIG 5A

| | |
|---|---|
| FIG 5 | FIG 5A |
| | FIG 5B |

310

314

308

| | | | | | |
|---|---|---|---|---|---|
| 1 | | | | C | $C_1$ |
| 0.7 | 0.7 | | | Lc/Rc | $S_1$ |
| | 1 | | | L/R | $S_2$ |
| | 0.7 | 0.7 | | Lss/Rss | $S_3$ |
| | | 1 | | Lsr/Rsr | $S_4$ |
| | | 0.7 | | Cs | $C_2$ |
| | | | 0.7 | LFE/LFE2 | $S_5$ |
| 1 | | | | Cv | $C_3$ |
| | 1 | | | Lv/Rv | $S_6$ |
| | 0.7 | 0.7 | | Lvss/Rvss | $S_7$ |
| 1 | | 0.5 | | Ts | $C_4$ |
| | | 1 | | Lvr/Rvr | $S_8$ |
| | | 0.7 | | Cvr | $C_5$ |
| 1 | | | | Cb | $C_6$ |
| | 1 | | | Lb/Rb | $S_9$ |
| C | L/R | Ls/Rs | LFE | | |

312

$C_7$ $S_{10}$ $S_{11}$ $A_1$

FIG 5B

| | | |
|---|---|---|
| FIG 5 | FIG 5A | |
| | FIG 5B | |

310, 314, 308

| | 1 | 2 | 3 | 4 | | |
|---|---|---|---|---|---|---|
| 1 | 1 | | | | C | $C_1$ |
| | 1 | 1 | | | Lc/Rc | $S_1$ |
| | | 1 | | | L/R | $S_2$ |
| | | 1 | 1 | | Lss/Rss | $S_3$ |
| 5 | | | 1 | | Lsr/Rsr | $S_4$ |
| | | | 1 | | Cs | $C_2$ |
| | | | | 1 | LFE/LFE2 | $S_5$ |
| | 1 | | | | Cv | $C_3$ |
| | | 1 | | | Lv/Rv | $S_6$ |
| 10 | | 1 | 1 | | Lvss/Rvss | $S_7$ |
| | 1 | | 1 | | Ts | $C_4$ |
| | | | 1 | | Lvr/Rvr | $S_8$ |
| | | | 1 | | Cvr | $C_5$ |
| | 1 | | | | Cb | $C_6$ |
| 15 | | 1 | | | Lb/Rb | $S_9$ |
| 312 | C | L/R | Ls/Rs | LFE | | |
| | $C_7$ | $S_{10}$ | $S_{11}$ | $A_1$ | | |

FIG 6

314 310

318 320

| C | L/R | Ls/Rs | LFE | |
|---|---|---|---|---|
| 1 | | | | C |
| 1 | 1 | | | Lc/Rc |
| | 1 | | | L/R |
| | 1 | 1 | | Lss/Rss |
| | | 1 | | Lsr/Rsr |
| | | 1 | | Cs |
| | | | 1 | LFE/LFE2 |
| 1 | | | | Cv |
| | 1 | | | Lv/Rv |
| | 1 | 1 | | Lvss/Rvss |
| 1 | | 1 | | Ts |
| | | 1 | | Lvr/Rvr |
| | | 1 | | Cvr |
| 1 | | | | Cb |
| | 1 | | | Lb/Rb |

312 308

314' 310'

318' 320'

| C | L/R | Ls/Rs | LFE | |
|---|---|---|---|---|
| 1 | | | | C |
| 1 | 1 | | | Lc/Rc |
| | 1 | | | L/R |
| | 1 | 1 | | Lss/Rss |
| | | 1 | | Lsr/Rsr |
| | | 1 | | Cs |
| | | | 1 | LFE/LFE2 |
| 1 | 1 | | | Cv |
| | 1 | | | Lv/Rv |
| | 1 | 1 | | Lvss/Rvss |
| 1 | 1 | 1 | | Ts |
| | | 1 | | Lvr/Rvr |
| | | 1 | | Cvr |
| 1 | | | | Cb |
| | 1 | | | Lb/Rb |

312' 316

FIG 7

METHOD FOR DECODING AND ENCODING A DOWNMIX MATRIX, METHOD FOR PRESENTING AUDIO CONTENT, ENCODER AND DECODER FOR A DOWNMIX MATRIX, AUDIO ENCODER AND AUDIO DECODER

CROSS-REFERENCE TO RELATED APPLICATIONS

This application is a continuation of copending U.S. patent application Ser. No. 17/807,095, filed Jun. 15, 2022, which in turn is a continuation of copending International Application No. PCT/EP2014/071929, filed Oct. 13, 2014, which is incorporated herein by reference in its entirety, and additionally claims priority from European Application No. 13189770.4, filed Oct. 22, 2013, which is also incorporated herein by reference in its entirety.

BACKGROUND OF THE INVENTION

The present invention relates to the field of audio encoding/decoding, especially to spatial audio coding and spatial audio object coding, for example to the field of 3D audio codec systems. Embodiments of the invention relate to methods for encoding and decoding a downmix matrix for mapping a plurality of input channels of audio content to a plurality of output channels, to a method for presenting audio content, to an encoder for encoding a downmix matrix, to a decoder for decoding a downmix matrix, to an audio encoder and to an audio decoder.

Spatial audio coding tools are well-known in the art and are standardized, for example, in the MPEG-surround standard. Spatial audio coding starts from a plurality of original input, e.g., five or seven input channels, which are identified by their placement in a reproduction setup, e.g., as a left channel, a center channel, a right channel, a left surround channel, a right surround channel and a low frequency enhancement channel. A spatial audio encoder may derive one or more downmix channels from the original channels and, additionally, may derive parametric data relating to spatial cues such as interchannel level differences in the channel coherence values, interchannel phase differences, interchannel time differences, etc. The one or more downmix channels are transmitted together with the parametric side information indicating the spatial cues to a spatial audio decoder for decoding the downmix channels and the associated parametric data in order to finally obtain output channels which are an approximated version of the original input channels. The placement of the channels in the output setup may be fixed, e.g., a 5.1 format, a 7.1 format, etc.

Also, spatial audio object coding tools are well-known in the art and are standardized, for example, in the MPEG SAOC standard (SAOC=Spatial Audio Object Coding). In contrast to spatial audio coding starting from original channels, spatial audio object coding starts from audio objects which are not automatically dedicated for a certain rendering reproduction setup. Rather, the placement of the audio objects in the reproduction scene is flexible and may be set by a user, e.g., by inputting certain rendering information into a spatial audio object coding decoder. Alternatively or additionally, rendering information may be transmitted as additional side information or metadata; rendering information may include information at which position in the reproduction setup a certain audio object is to be placed (e.g., over time). In order to obtain a certain data compression, a number of audio objects is encoded using an SAOC encoder which calculates, from the input objects, one or more transport channels by downmixing the objects in accordance with certain downmixing information. Furthermore, the SAOC encoder calculates parametric side information representing inter-object cues such as object level differences (OLD), object coherence values, etc. As in SAC (SAC=Spatial Audio Coding), the inter object parametric data is calculated for individual time/frequency tiles. For a certain frame (for example, 1024 or 2048 samples) of the audio signal a plurality of frequency bands (for example 24, 32, or 64 bands) are considered so that parametric data is provided for each frame and each frequency band. For example, when an audio piece has 20 frames and when each frame is subdivided into 32 frequency bands, the number of time/frequency tiles is 640.

In 3D audio systems it may be desired to provide a spatial impression of an audio signal at a receiver using a loudspeaker or speaker configuration as it is available at the receiver which, however, may be different from an original speaker configuration for the original audio signal. In such a situation, a conversion needs to be carried out, which is also referred to as a “downmix” in accordance with which the input channels, in accordance with the original speaker configuration of the audio signal, are mapped to output channels defined in accordance with the speaker configuration of the receiver.

SUMMARY

According to an embodiment, a method for decoding a downmix matrix for mapping a plurality of input channels of audio content to a plurality of output channels, the input and output channels being associated with respective speakers at predetermined positions relative to a listener position, wherein the downmix matrix is encoded by exploiting the symmetry of speaker pairs of the plurality of input channels and the symmetry of speaker pairs of the plurality of output channels, may have the steps of: receiving encoded information representing the encoded downmix matrix from an encoder; and decoding the encoded information for obtaining the decoded downmix matrix, wherein respective pairs of input and output channels in the downmix matrix have associated respective mixing gains for adapting a level by which a given input channel contributes to a given output channel, and wherein the method may further have the steps of: decoding from the information representing the downmix matrix encoded significance values, wherein respective significance values are assigned to pairs of symmetric speaker groups of the input channels and symmetric speaker groups of the output channels, the significance value indicating if a mixing gain for one or more of the input channels is zero or not; and decoding from the information representing the downmix matrix encoded mixing gains.

Another embodiment may have a method for encoding a downmix matrix for mapping a plurality of input channels of audio content to a plurality of output channels, the input and output channels being associated with respective speakers at predetermined positions relative to a listener position, wherein encoding the downmix matrix includes exploiting the symmetry of speaker pairs of the plurality of input channels and the symmetry of speaker pairs of the plurality of output channels wherein respective pairs of input and output channels in the downmix matrix have associated respective mixing gains for adapting a level by which a given input channel contributes to a given output channel, wherein respective significance values are assigned to pairs of symmetric speaker groups of the input channels and symmetric speaker groups of the output channels, the significance value indicating if a mixing gain for one or more of the input channels is zero or not, and the method may further have the steps of: encoding the significance values, and encoding the mixing gains.

According to another embodiment, a method for presenting audio content having a plurality of input channels to a system having a plurality of output channels different from the input channels may have the steps of: providing the audio content and a downmix matrix for mapping the input channels to the output channels, encoding the audio content; encoding the downmix matrix in accordance with the inventive method; transmitting the encoded audio content and the encoded downmix matrix to the system; decoding the audio content; decoding downmix matrix in accordance with the inventive method; and mapping the input channels of the audio content to the output channels of the system using the decoded downmix matrix, wherein the downmix matrix is encoded/decoded in accordance with the inventive methods.

Another embodiment may have a non-transitory digital storage medium having a computer program stored thereon to perform the inventive methods when said computer program is run by a computer.

According to another embodiment, an encoder for encoding a downmix matrix for mapping a plurality of input channels of audio content to a plurality of output channels, the input and output channels being associated with respective speakers at predetermined positions relative to a listener position, may have: a processor configured to encode the downmix matrix in accordance with the inventive method.

According to another embodiment, a decoder for decoding a downmix matrix for mapping a plurality of input channels of audio content to a plurality of output channels, the input and output channels being associated with respective speakers at predetermined positions relative to a listener position, wherein the downmix matrix is encoded by exploiting the symmetry of speaker pairs of the plurality of input channels and the symmetry of speaker pairs of the plurality of output channels, may have: a processor configured to operate in accordance with the inventive method for decoding.

According to another embodiment, an audio encoder for encoding an audio signal may have an inventive encoder.

According to another embodiment, an audio decoder for decoding an encoded audio signal may have an inventive decoder.

The present invention is based on the finding that a more efficient coding of a steady downmix matrix can be achieved by exploiting symmetries that can be found in the input channel configuration and in the output channel configuration with regard to the placement of speakers associated with the respective channels. It has been found by the inventors of the present invention that exploiting such symmetry allows combining the symmetrically arranged speakers into a common row/column of the downmix matrix, for example those speakers which have, with regard to the listener position, a position having the same elevation angle and the same absolute value of the Azimuth angle but with different signs. This allows for generating a compact downmix matrix having a reduced size which, therefore, can be more easily and more efficiently encoded when compared to the original downmix matrix.

In accordance with embodiments, not only symmetric speaker groups are defined, but actually three classes of speaker groups are created, namely the above-mentioned symmetric speakers, the center speakers and the asymmetric speakers, which can then be used for generating the compact representation. This approach is advantageous as it allows speakers from the respective classes to be handled differently and thereby more efficiently.

In accordance with embodiments, encoding the compact downmix matrix comprises encoding the gain values separate from the information about the actual compact downmix matrix. The information about the actual compact downmix matrix is encoded by creating a compact significance matrix, which indicates with regard to the compact input/output channel configurations the existence of non-zero gains by merging each of the input and output symmetric speaker pairs into one group. This approach is advantageous as it allows for an efficient encoding of the significance matrix on the basis of a run-length scheme.

In accordance with embodiments a template matrix may be provided that is similar to the compact downmix matrix in that the entries in the matrix elements of the template matrix substantially correspond to the entries in the matrix elements in the compact downmix matrix. In general, such template matrices are provided at the encoder and at the decoder and only differ from the compact downmix matrix in a reduced number of matrix elements so that by applying an element-wise XOR to the compact significance matrix with such a template matrix will drastically reduce the number of ones. This approach is advantageous as it allows for even further increasing the efficiency of encoding the significance matrix, again, using for example a run-length scheme.

In accordance with a further embodiment, the encoding is further based on an indication whether normal speakers are mixed only to normal speakers and LFE speakers are mixed only to LFE speakers. This is advantageous as it further improves the coding of the significance matrix.

In accordance with a further embodiment the compact significance matrix or the result of the above-mentioned XOR operation is provided as to a one-dimensional vector to which a run-length coding is applied to convert it to runs of zeros which are followed by a one which is advantageous as it provides a very efficient possibility for coding the information. To achieve an even more efficient coding, in accordance with the embodiments a limited Golomb-Rice encoding is applied to the run-length values.

In accordance with further embodiments for each output speaker group it is indicated whether the properties of symmetry and separability apply for all corresponding input speaker groups that generate them. This is advantageous as it indicates that in a speaker group consisting, for example, of left and right speakers, the left speakers in the input channel group are mapped only to the left channels in the corresponding output speaker group, the right speakers in the input channel group are only mapped to the right speakers in the output channel group, and there is no mixing from the left channel to the right channel. This allows replacing the four gain values in the 2×2 sub-matrix in the original downmix matrix by a single gain value that may be introduced into the compact matrix or, in case the compact matrix is a significance matrix may be coded separately. In any case, the overall number of gain values to be coded is reduced. Thus, the signaled properties of symmetry and separability are advantageous as they allow efficiently coding the sub-matrices corresponding to each pair of input and output speaker groups.

In accordance with embodiments, for coding the gain values a list of possible gains is created in a particular order using a signaled minimum and maximum gain and also a signaled desired precision. The gain values are created in such an order that commonly used gains are at the beginning of the list or table. This is advantageous as it allows efficiently encoding the gain values by applying to the most frequently used gains the shortest code words for encoding them.

In accordance with an embodiment, the gain values generated may be provided in a list, each entry in a list having associated therewith an index. When coding the gain values, rather than coding the actual values, the indexes of the gains are encoded. This may be done, for example by applying a limited Golomb-Rice encoding approach. This handling of the gain values is advantageous as it allows efficiently encoding them.

In accordance with embodiments, equalizer (EQ) parameters may be transmitted along with the downmix matrix.

BRIEF DESCRIPTION OF THE DRAWINGS

Embodiments of the present invention will be detailed subsequently referring to the appended drawings, in which:

FIG. 4 illustrates an exemplary downmix matrix as it is known in the art for mapping from a 22.2 input configuration to a 5.1 output configuration;

FIG. 5 including FIGS. 5A and 5B schematically illustrates an embodiment of the present invention for converting the original downmix matrix of FIG. 4 into a compact downmix matrix;

FIG. 6 illustrates the compact downmix matrix of FIG. 5 in accordance with an embodiment of the present invention having the converted input and output channel configurations with the matrix entries representing significance values;

FIG. 7 illustrates a further embodiment of the present invention for encoding the structure of the compact downmix matrix of FIG. 5 using a template matrix.

DETAILED DESCRIPTION OF THE INVENTION

Embodiments of the inventive approach will be described. The following description will start with a system overview of a 3D audio codec system in which the inventive approach may be implemented.

Figure 1:
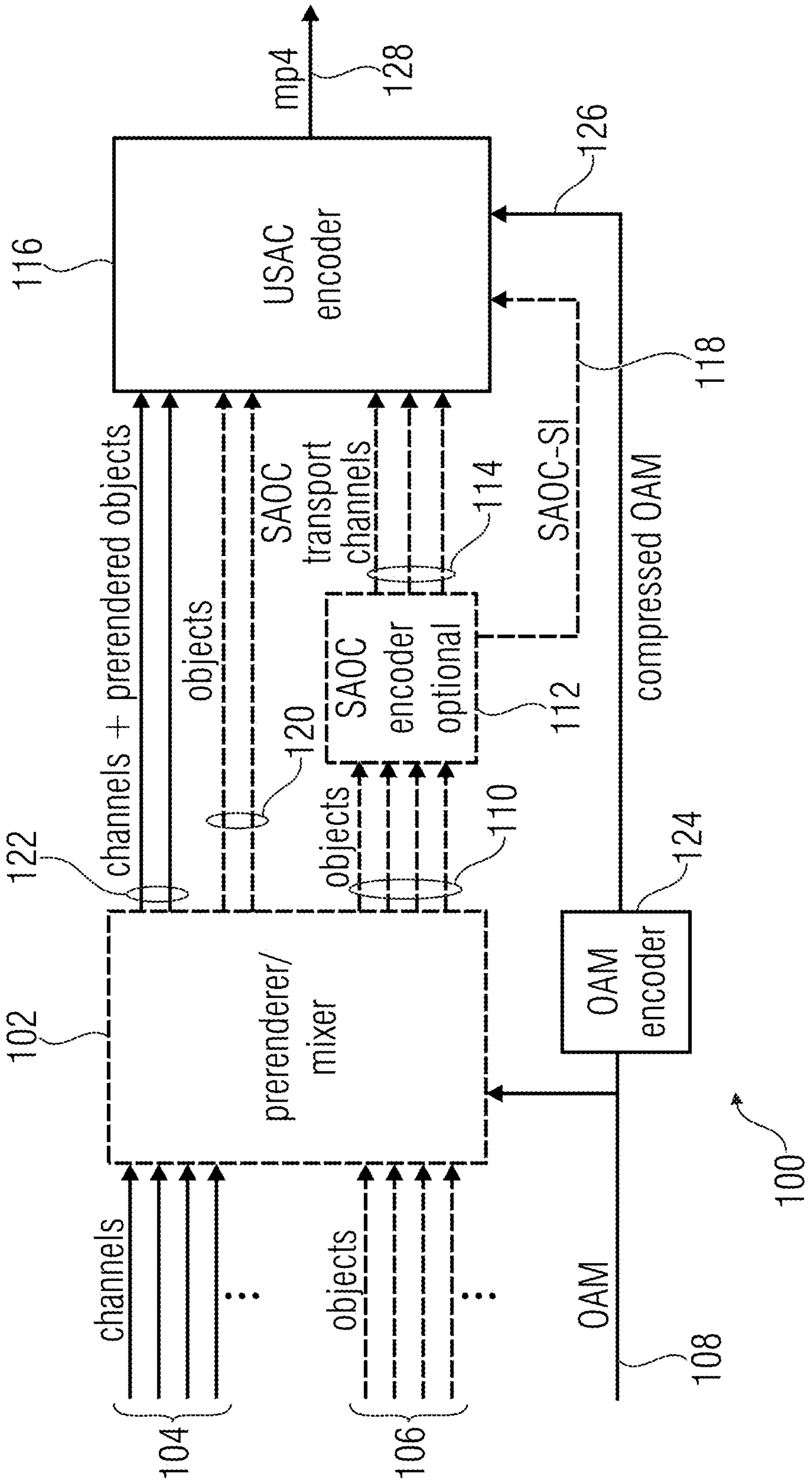
FIG. 1 illustrates an overview of a 3D audio encoder of a 3D audio system.
Figure 2:
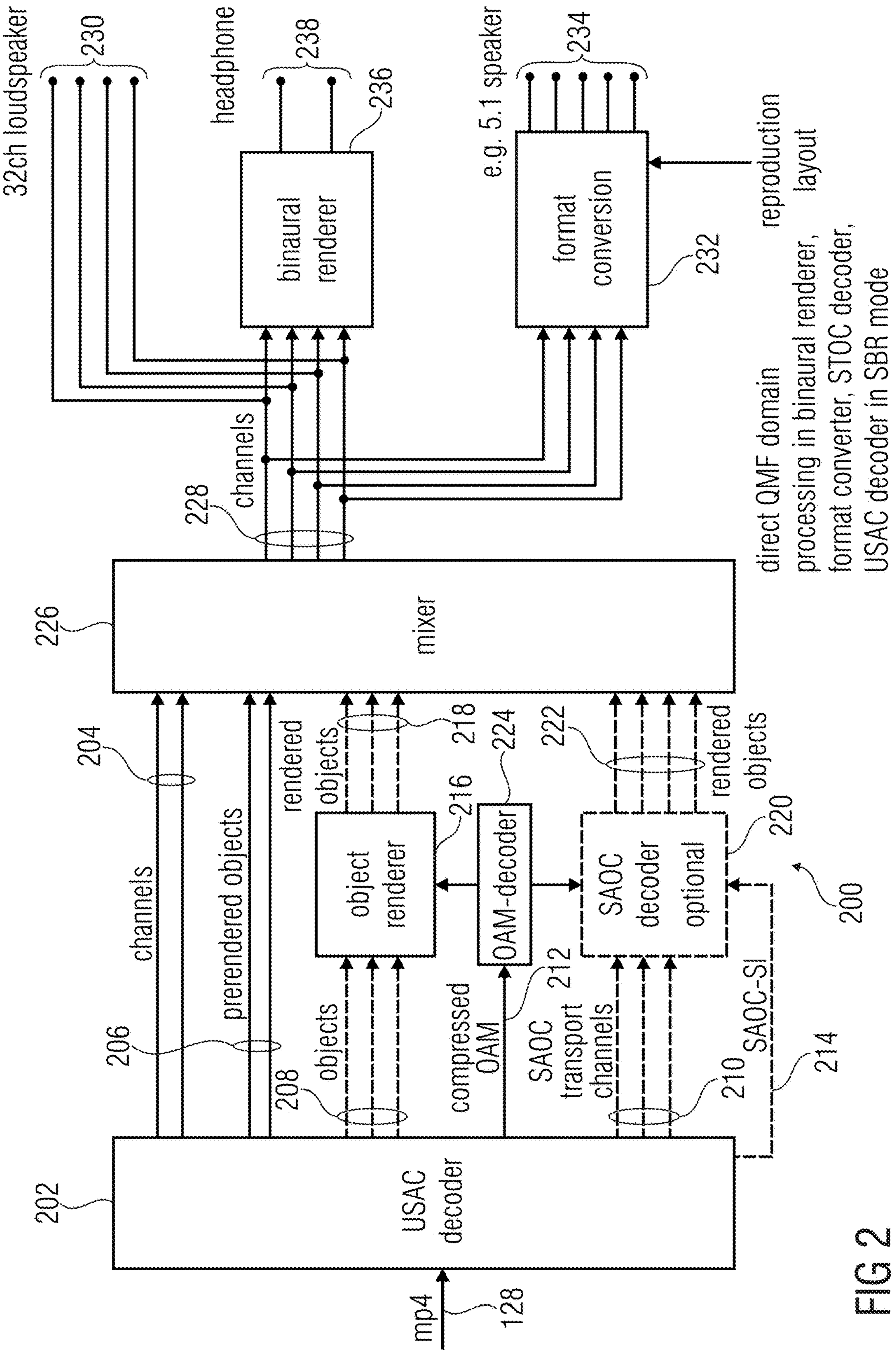
FIG. 2 illustrates an overview of a 3D audio decoder of a 3D audio system.

FIGS. 1 and 2 show the algorithmic blocks of a 3D audio system in accordance with embodiments. More specifically, FIG. 1 shows an overview of a 3D audio encoder 100. The audio encoder 100 receives at a pre-renderer/mixer circuit 102, which may be optionally provided, input signals, more specifically a plurality of input channels providing to the audio encoder 100 a plurality of channel signals 104, a plurality of object signals 106 and corresponding object metadata 108. The object signals 106 processed by the pre-renderer/mixer 102 (see signals 110) may be provided to a SAOC encoder 112 (SAOC=Spatial Audio Object Coding). The SAOC encoder 112 generates the SAOC transport channels 114 provided to an USAC encoder 116 (USAC=Unified Speech and Audio Coding). In addition, the signal SAOC-SI 118 (SAOC-SI=SAOC Side Information) is also provided to the USAC encoder 116. The USAC encoder 116 further receives object signals 120 directly from the pre-renderer/mixer as well as the channel signals and pre-rendered object signals 122. The object metadata information 108 is applied to a OAM encoder 124 (OAM=Object Associated Metadata) providing the compressed object metadata information 126 to the USAC encoder. The USAC encoder 116, on the basis of the above mentioned input signals, generates a compressed output signal mp4, as is shown at 128.

FIG. 2 shows an overview of a 3D audio decoder 200 of the 3D audio system. The encoded signal 128 (mp4) generated by the audio encoder 100 of FIG. 1 is received at the audio decoder 200, more specifically at an USAC decoder 202. The USAC decoder 202 decodes the received signal 128 into the channel signals 204, the pre-rendered object signals 206, the object signals 208, and the SAOC transport channel signals 210. Further, the compressed object metadata information 212 and the signal SAOC-SI 214 is output by the USAC decoder 202. The object signals 208 are provided to an object renderer 216 outputting the rendered object signals 218. The SAOC transport channel signals 210 are supplied to the SAOC decoder 220 outputting the rendered object signals 222. The compressed object meta information 212 is supplied to the OAM decoder 224 outputting respective control signals to the object renderer 216 and the SAOC decoder 220 for generating the rendered object signals 218 and the rendered object signals 222. The decoder further comprises a mixer 226 receiving, as shown in FIG. 2, the input signals 204, 206, 218 and 222 for outputting the channel signals 228. The channel signals can be directly output to a loudspeaker, e.g., a 32 channel loudspeaker, as is indicated at 230. The signals 228 may be provided to a format conversion circuit 232 receiving as a control input a reproduction layout signal indicating the way the channel signals 228 are to be converted. In the embodiment depicted in FIG. 2, it is assumed that the conversion is to be done in such a way that the signals can be provided to a 5.1 speaker system as is indicated at 234. Also, the channel signals 228 may be provided to a binaural renderer 236 generating two output signals, for example for a headphone, as is indicated at 238.

In an embodiment of the present invention, the encoding/decoding system depicted in FIGS. 1 and 2 is based on the MPEG-D USAC codec for coding of channel and object signals (see signals 104 and 106). To increase the efficiency for coding a large amount of objects, the MPEG SAOC technology may be used. Three types of renderers may perform the tasks of rendering objects to channels, rendering channels to headphones or rendering channels to a different loudspeaker setup (see FIG. 2, reference signs 230, 234 and 238). When object signals are explicitly transmitted or parametrically encoded using SAOC, the corresponding object metadata information 108 is compressed (see signal 126) and multiplexed into the 3D audio bitstream 128.

The algorithm blocks of the overall 3D audio system shown in FIGS. 1 and 2 will be described in further detail below.

The pre-renderer/mixer 102 may be optionally provided to convert a channel plus object input scene into a channel scene before encoding. Functionally, it is identical to the object renderer/mixer that will be described below. Pre-rendering of objects may be desired to ensure a deterministic signal entropy at the encoder input that is basically independent of the number of simultaneously active object signals. With pre-rendering of objects, no object metadata transmission is necessitated. Discrete object signals are rendered to the channel layout that the encoder is configured to use. The weights of the objects for each channel are obtained from the associated object metadata (OAM).

The USAC encoder 116 is the core codec for loudspeaker-channel signals, discrete object signals, object downmix signals and pre-rendered signals. It is based on the MPEG-D USAC technology. It handles the coding of the above signals by creating channel- and object mapping information based on the geometric and semantic information of the input channel and object assignment. This mapping information describes how input channels and objects are mapped to USAC-channel elements, like channel pair elements (CPEs), single channel elements (SCEs), low frequency effects (LFEs) and quad channel elements (QCEs) and CPEs, SCEs and LFEs, and the corresponding information is transmitted to the decoder. All additional payloads like SAOC data 114, 118 or object metadata 126 are considered in the encoder's rate control. The coding of objects is possible in different ways, depending on the rate/distortion requirements and the interactivity requirements for the renderer. In accordance with embodiments, the following object coding variants are possible:

- Pre-rendered objects: Object signals are pre-rendered and mixed to the 22.2 channel signals before encoding. The subsequent coding chain sees 22.2 channel signals.
- Discrete object waveforms: Objects are supplied as monophonic waveforms to the encoder. The encoder uses single channel elements (SCEs) to transmit the objects in addition to the channel signals. The decoded objects are rendered and mixed at the receiver side. Compressed object metadata information is transmitted to the receiver/renderer.
- Parametric object waveforms: Object properties and their relation to each other are described by means of SAOC parameters. The downmix of the object signals is coded with the USAC. The parametric information is transmitted alongside. The number of downmix channels is chosen depending on the number of objects and the overall data rate. Compressed object metadata information is transmitted to the SAOC renderer.

The SAOC encoder 112 and the SAOC decoder 220 for object signals may be based on the MPEG SAOC technology. The system is capable of recreating, modifying and rendering a number of audio objects based on a smaller number of transmitted channels and additional parametric data, such as OLDs, IOCs (Inter Object Coherence), DMGs (DownMix Gains). The additional parametric data exhibits a significantly lower data rate than necessitated for transmitting all objects individually, making the coding very efficient. The SAOC encoder 112 takes as input the object/channel signals as monophonic waveforms and outputs the parametric information (which is packed into the 3D-Audio bitstream 128) and the SAOC transport channels (which are encoded using single channel elements and are transmitted). The SAOC decoder 220 reconstructs the object/channel signals from the decoded SAOC transport channels 210 and the parametric information 214, and generates the output audio scene based on the reproduction layout, the decompressed object metadata information and optionally on the basis of the user interaction information.

The object metadata codec (see OAM encoder 124 and OAM decoder 224) is provided so that, for each object, the associated metadata that specifies the geometrical position and volume of the objects in the 3D space is efficiently coded by quantization of the object properties in time and space. The compressed object metadata cOAM 126 is transmitted to the receiver 200 as side information.

The object renderer 216 utilizes the compressed object metadata to generate object waveforms according to the given reproduction format. Each object is rendered to a certain output channel according to its metadata. The output of this block results from the sum of the partial results. If both channel based content as well as discrete/parametric objects are decoded, the channel based waveforms and the rendered object waveforms are mixed by the mixer 226 before outputting the resulting waveforms 228 or before feeding them to a postprocessor module like the binaural renderer 236 or the loudspeaker renderer module 232.

The binaural renderer module 236 produces a binaural downmix of the multichannel audio material such that each input channel is represented by a virtual sound source. The processing is conducted frame-wise in the QMF (Quadrature Mirror Filterbank) domain, and the binauralization is based on measured binaural room impulse responses.

The loudspeaker renderer 232 converts between the transmitted channel configuration 228 and the desired reproduction format. It may also be called "format converter". The format converter performs conversions to lower numbers of output channels, i.e., it creates downmixes.

Figure 3:
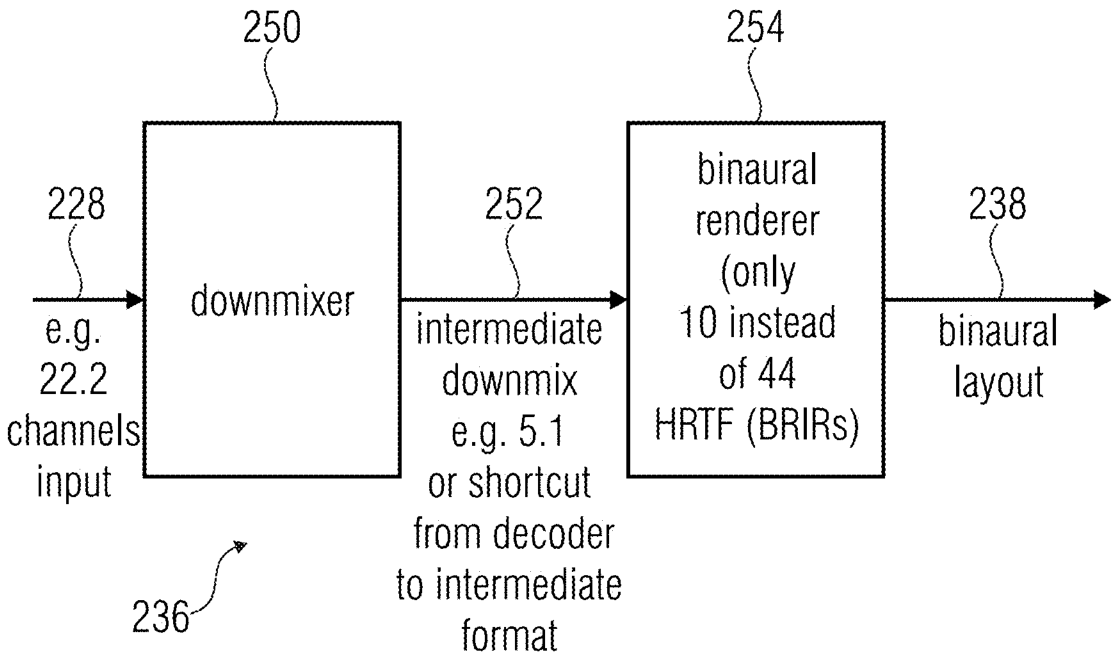
FIG. 3 illustrates an embodiment of a binaural renderer that may be implemented in the 3D audio decoder of FIG. 2.

FIG. 3 illustrates an embodiment of the binaural renderer 236 of FIG. 2. The binaural renderer module may provide a binaural downmix of the multichannel audio material. The binauralization may be based on a measured binaural room impulse response. The room impulse response may be considered a "fingerprint" of the acoustic properties of a real room. The room impulse response is measured and stored, and arbitrary acoustical signals can be provided with this "fingerprint", thereby allowing at the listener a simulation of the acoustic properties of the room associated with the room impulse response. The binaural renderer 236 may be programmed or configured for rendering the output channels into two binaural channels using head related transfer functions or Binaural Room Impulse Responses (BRIR). For example, for mobile devices binaural rendering is desired for headphones or loudspeakers attached to such mobile devices. In such mobile devices, due to constraints it may be necessitated to limit the decoder and rendering complexity. In addition to omitting decorrelation in such processing scenarios, it may be advantageous to first perform a downmix using a downmixer 250 to an intermediate downmix signal 252, i.e., to a lower number of output channels which results in a lower number of input channel for the actual binaural converter 254. For example, a 22.2 channel material may be downmixed by the downmixer 250 to a 5.1 intermediate downmix or, alternatively, the intermediate downmix may be directly calculated by the SAOC decoder 220 in FIG. 2 in a kind of a "shortcut" mode. The binaural rendering then only has to apply ten HRTFs (Head Related Transfer Functions) or BRIR functions for rendering the five individual channels at different positions in contrast to applying 44 HRTF or BRIR functions if the 22.2 input channels were to be directly rendered. The convolution operations necessitated for the binaural rendering necessitate a lot of processing power and, therefore, reducing this processing power while still obtaining an acceptable audio quality is particularly useful for mobile devices. The binaural renderer 236 produces a binaural downmix 238 of the multichannel audio material 228, such that each input channel (excluding the LFE channels) is represented by a virtual sound source. The processing may be conducted frame-wise in QMF domain. The binauralization is based on measured binaural room impulse responses, and the direct sound and early reflections may be imprinted to the audio material via a convolutional approach in a pseudo-FFT domain using a fast convolution on-top of the QMF domain, while late reverberation may be processed separately.

Multichannel audio formats are currently present in a large variety of configurations, they are used in a 3D audio system as it has been described above in detail which is used, for example, for providing audio information provided on DVDs and Blue-ray discs. One important issue is to accommodate the real-time transmission of multi-channel audio, while maintaining the compatibility with existing available customer physical speaker setups. A solution is to encode the audio content in the original format used, for example, in production, which typically has a large number of output channels. In addition, downmix side information is provided to generate other formats which have less independent channels. Assuming, for example, a number N of input channels and a number M of output channels, the downmix procedure at the receiver may be specified by a downmix matrix having the size N×M. This particular procedure, as it might be carried out in the downmixer of the above described format converter or binaural renderer, represents a passive downmix, meaning that no adaptive signal processing dependent on the actual audio content is applied to the input signals or to the downmixed output signals.

A downmix matrix tries to match not only the physical mixing of the audio information, but may also convey the artistic intentions of the producer which may use his knowledge about the actual content that is transmitted. Therefore, there are several ways of generating downmix matrices, for example manually by using generic acoustic knowledge about the role and position of the input and output speakers, manually by using knowledge about the actual content and the artistic intention, and automatically, for example by using a software tool which computes an approximation using the given output speakers.

There are a number of known approaches in the art for providing such downmix matrices. However, existing schemes make many assumptions and hard-code an important part of the structure and the contents of the actual downmix matrix. In prior art reference [1] it is described to use particular downmixing procedures that are explicitly defined for downmixing from the 5.1 channel configuration (see prior art reference [2]) to the 2.0 channel configuration, from the 6.1 or 7.1 Front or Front Height or Surround Back variants to the 5.1 or 2.0 channel configurations. The drawback of these known approaches is that the downmixing schemes only have a limited degree of freedom in the sense that some of the input channels are mixed with predefined weights (for example, in case of mapping the 7.1 Surround Back to the 5.1 configuration, the L, R and C input channels are directly mapped to the corresponding output channels) and a reduced number of gain values is shared for some other input channels (for example, in case of mapping the 7.1 Front to the 5.1 configuration, the L, R, Lc and Rc input channels are mixed to the L and R output channels using only one gain value). Moreover, the gains only have a limited range and precision, for example from 0 dB to −9 dB with a total of eight levels. Explicitly describing the downmix procedures for each input and output configuration pair is laborious and implies addendums to existing standards, at the expense of delayed compliance. Another proposal is described in prior art reference [5]. This approach uses explicit downmix matrices which represent an improvement in flexibility, however, the scheme again limits the range and precision of 0 dB to −9 dB with a total of 16 levels. Moreover, each gain is encoded with a fixed precision of 4 bits.

Thus, in view of the prior art known, an improved approach for efficient coding of downmix matrices is needed, including the aspects of choosing a suitable representation domain and quantization scheme but also a lossless coding of the quantized values.

In accordance with embodiments, unrestricted flexibility is achieved for handling downmix matrices by allowing encoding of arbitrary downmix matrices, with the range and the precision specified by the producer according to his needs. Also, embodiments of the invention provide for a very efficient lossless coding so the typical matrices use a small amount of bits, and departing from typical matrices will only gradually decrease efficiency. This means that the more similar a matrix is to a typical one, the more efficient the coding described in accordance with embodiments of the present invention will be.

In accordance with embodiments, the necessitated precision may be specified by the producer as 1 dB, 0.5 dB or 0.25 dB, to be used for uniform quantization. It is noted that in accordance with other embodiments, also other values for the precision can be selected. Contrary thereto, existing schemes only allow for a precision of 1.5 dB or 0.5 dB for values around 0 dB, while using a lower precision for the other values. Using a coarser quantization for some values affects the worst case tolerances achieved and makes interpretation of decoded matrices more difficult. In existing techniques, a lower precision is used for some values which is a simple means to reduce the number of necessitated bits using uniform coding. However, practically the same results can be achieved without sacrificing precision by using an improved coding scheme that will be described in further detail below.

In accordance with embodiments, the values of the mixing gains can be specified between a maximum value, for example +22 dB and a minimum value, for example −47 dB. They may also include the value minus infinity. The effective value range used in the matrix is indicated in the bit stream as a maximum gain and a minimum gain, thereby not wasting any bits on values which are not actually used while not limiting the desired flexibility.

In accordance with embodiments, it is assumed that an input channel list of the audio content for which the downmix matrix is to be provided is available, as well as an output channel list indicative of the output speaker configuration. These lists provide geometrical information about each speaker in the input configuration and in the output configuration such as the azimuth angle and the elevation angle. Optionally, also the speakers conventional names may be provided.

FIG. 4 shows an exemplary downmix matrix as it is known in the art for mapping from a 22.2 input configuration to a 5.1 output configuration. In the right-hand column 300 of the matrix, the respective input channels in accordance with the 22.2 configuration are indicated by the speaker names associated with the respective channels. The bottom row 302 includes the respective output channels of the output channel configuration, the 5.1 configuration. Again, the respective channels are indicated by the associated speaker names. The matrix includes a plurality of matrix elements 304 each holding a gain value, also referred to as a mixing gain. The mixing gain indicates how the level of a given input channel is adjusted, for example one of the input channels 300, when contributing to a respective output channel 302. For example, the upper left-hand matrix element shows a value of "1" meaning that the center channel C in the input channel configuration 300 is completely matched to the center channel C of the output channel configuration 302. Likewise, the respective left and right channels in the two configurations (L/R channels) are completely mapped, i.e., the left/right channels in the input configuration contribute completely to the left/right channels in the output configuration. Other channels, for example the channels Lc and Rc in the input configuration, are mapped with a reduced level of 0.7 to the left and right channels of the output configuration 302. As can be seen from FIG. 4, there is also a number of matrix elements not having an entry meaning that the respective channels associated with the matrix element are not mapped to each other or meaning that an input channel linked to an output channel via a matrix element having no entry does not contribute to the respective output channel. For example, neither of the left/right input channels is mapped to the output channels Ls/Rs, i.e., the left and right input channels do not contribute to the output channels Ls/Rs. Instead of providing voids in the matrix, also a zero gain could have been indicated.

In the following several techniques will be described which are applied in accordance with embodiments of the present invention to achieve an efficient lossless coding of the downmix matrix. In the following embodiments, reference will be made to a coding of the downmix matrix shown in FIG. 4, however it is readily apparent that the specifics described in the following can be applied to any other downmix matrix that may be provided. In accordance with embodiments an approach for decoding a downmix matrix is provided, wherein the downmix matrix is encoded by exploiting the symmetry of speaker pairs of the plurality of input channels and the symmetry of speaker pairs of the plurality of output channels. The downmix matrix is decoded following its transmission to a decoder, e.g. at an audio decoder receiving a bitstream including the encoded audio content and also encoded information or data representing the downmix matrix, allowing to construct at the decoder a downmix matrix corresponding to the original downmix matrix. Decoding the downmix matrix comprises receiving the encoded information representing the downmix matrix and decoding the encoded information for obtaining the downmix matrix. In accordance with other embodiments, an approach for encoding the downmix matrix is provided which comprises exploiting the symmetry of speaker pairs of the plurality of input channels and the symmetry of speaker pairs of the plurality of output channels.

In the following description of embodiments of the invention some aspects will be described in the context of encoding the downmix matrix, however, to the skilled reader, it is clear that these aspects also represent a description of the corresponding approach for decoding the downmix matrix. Analogously, aspects described in the context of decoding the downmix matrix also represent a description of a corresponding approach for encoding the downmix matrix.

In accordance with embodiments, the first step is to take advantage of the significant number of zero entries in the matrix. In the following step, in accordance with embodiments, one takes advantage of the global and also the fine level regularities which are typically present in a downmix matrix. A third step is to take advantage of the typical distribution of the nonzero gain values.

In accordance with a first embodiment, the inventive approach starts from a downmix matrix, as it may be provided by a producer of the audio content. For the following discussion, for the sake of simplicity, it is assumed that the downmix matrix considered is the one of FIG. 4. In accordance with the inventive approach, the downmix matrix of FIG. 4 is converted for providing a compact downmix matrix that can be more efficiently encoded when compared to the original matrix.

FIG. 5 schematically represents the just mentioned conversion step. In the upper part of FIG. 5, the original downmix matrix 306 of FIG. 4 is shown that is converted in a way that will be described in further detail below into a compact downmix matrix 308 shown in the lower part of FIG. 5. In accordance with the inventive approach, the concept of "symmetric speaker pairs" is used which means that one speaker is in the left semi-plane, while the other is in the right semi-plane, relative to a listener position. This symmetric pair configuration corresponds to the two speakers having the same elevation angle, while having the same absolute value for the azimuth angle but with different signs.

In accordance with embodiments different classes of speaker groups are defined, mainly symmetric speakers S, center speakers C, and asymmetric speakers A. Center speakers are those speakers whose positions do not change when changing the sign of the azimuth angle of the speaker position. Asymmetric speakers are those speakers that lack the other or corresponding symmetric speaker in a given configuration, or in some rare configurations the speaker on the other side may have a different elevation angle or azimuth angle so that in this case there are two separate asymmetric speakers instead of a symmetric pair. In the downmix matrix 306 shown in FIG. 5, the input channel configuration 300 includes nine symmetric speaker pairs $S_1$ to $S_9$ that are indicated in the upper part of FIG. 5. For example, symmetric speaker pair $S_1$ includes the speakers Lc and Rc of the 22.2 input channel configuration 300. Also the LFE speakers in the 22.2 input configuration are symmetrical speakers as they have, with regard to the listener position, the same elevation angle and the same absolute azimuth angle with different signs. The 22.2 input channel configuration 300 further includes six central speakers $C_1$ to $C_6$, namely speakers C, Cs, Cv, Ts, Cvr and Cb. No asymmetric channel is present in the input channel configuration. The output channel configuration 302, other than the input channel configuration, only includes two symmetrical speaker pairs $S_{10}$ and $S_{11}$ and one central speaker $C_7$ and one asymmetric speaker $A_1$.

In accordance with the described embodiment, the downmix matrix 306 is converted to a compact representation 308 by grouping together input and output speakers which form symmetric speaker pairs. Grouping the respective speakers together yields a compact input configuration 310 including the same center speakers $C_1$ to $C_6$ as in the original input configuration 300. However, when compared to the original input configuration 300 the symmetric speakers $S_1$ to $S_9$ are respectively grouped together such that the respective pairs now occupy only a single row, as is indicated in the lower part of FIG. 5. In a similar way, also the original output channel configuration 302 is converted into a compact output channel configuration 312 also including the original center and non-symmetric speakers, namely the central speaker $C_7$ and the asymmetrical speaker $A_1$. However, the respective speaker pairs $S_{10}$ and $S_{11}$ were combined into a single column. Thus, as can be seen from FIG. 5, the dimension of the original downmix matrix 306 which was 24×6 was reduced to a dimension of the compact downmix matrix 308 of 15×4.

In the embodiment described with regard to FIG. 5 one can see that in the original downmix matrix 306 the mixing gains associated with the respective symmetric speaker pairs $S_1$ to $S_{11}$, which indicate how strongly an input channel contributes to an output channel, are symmetrically arranged for corresponding symmetrical speaker pairs in the input channel and in the output channel. For example, when looking at the pair $S_1$ and $S_{10}$, the respective left and right channels are combined via the gain 0.7 while the combinations of left/right channels are combined with the gain 0. Thus, when grouping the respective channels together in a way as shown in the compact downmix matrix 308, the compact downmix matrix elements 314 may include the respective mixing gains also described with regard to the original matrix 306. Thus, in accordance with the above described embodiment, the size of the original downmix matrix is reduced by grouping symmetrical speaker pairs together so that the "compact" representation 308 can be encoded more efficiently than the original downmix matrix.

With regard to FIG. 6, a further embodiment of the present invention will now be described. FIG. 6 again shows the compact downmix matrix 308 having the converted input and output channel configuration 310, 312 as already shown and described with regard to FIG. 5. In the embodiment of FIG. 6, the matrix entries 314 of the compact downmix matrix, other than in FIG. 5, do not represent any gain values but so-called "significance values". A significance value indicates if at the respective matrix elements 314 any of the gains associated therewith is zero or not. Those matrix elements 314 showing the value "1" indicate that the respective element has associated therewith a gain value, while the void matrix elements indicate that no gain or gain value of zero is associated with this element. In accordance with this embodiment, replacing the actual gain values by the significance values allows for even further efficiently encoding the compact downmix matrix when compared to FIG. 5 as the representation 308 of FIG. 6 can be simply encoded using, for example, one bit per entry indicating a value of 1 or a value of 0 for the respective significance values. In addition, besides encoding the significance values it will also be necessitated to encode the respective gain values associated with the matrix elements so that upon decoding the information received the complete downmix matrix can be reconstructed.

In accordance with another embodiment, the representation of the downmix matrix in its compact form as shown in FIG. 6 can be encoded using a run-length scheme. In such a run-length scheme, the matrix elements 314 are transformed into a one-dimensional vector by concatenating the rows starting with row 1 and ending with row 15. This one-dimensional vector is then converted into a list containing the run lengths, for example the number of consecutive zeros which is terminated by a 1. In the embodiment of FIG. 6, this yields the following list:

```
1000   1100   0100   0110    0010   0010  0001     1000   0100   0110   1010   0010   0010   1000   0100   (1)
0      30      3      30       3      3         4   0        4       30   1 1       3      3   1        4        2
```

where (1) represents a virtual termination in case the bit vector ends with a 0. The above shown run-length may be coded using an appropriate coding scheme, such as a limited Golomb-Rice coding which assigns a variable length prefix code to each number, so that the total bit length is minimized. The Golomb-Rice coding approach is used to code a non-negative integer n≥0, using a non-negative integer parameter p≥0 as follows: first, the number $h=[n/2^p]$ is coded using a unary coding, the h one (1) bits being followed by a terminating zero bit; then the number $l=n-h\cdot 2^p$ is uniformly coded using p bits.

The limited Golomb-Rice coding is a trivial variant used when it is known in advance that n<N. It does not include the terminating zero bit when coding the maximum possible value of h, which is $h_{max}=[(N-1)/2^p]$. More exactly, to encode $h=h_{max}$ only h one (1) bits are used without the terminating zero bit, which is not needed because the decoder can implicitly detect this condition.

As mentioned above, the gains associated with the respective element 314 need to be encoded and transmitted as well and embodiments for doing this will be described in detail further below. Prior to discussing the encoding of the gains in detail, further embodiments for encoding the structure of the compact downmix matrix shown in FIG. 6 will now be described.

FIG. 7 describes a further embodiment for encoding the structure of the compact downmix matrix by making use of the fact that typical compact matrices have some meaningful structure so that they are in general similar to a template matrix that is available both at an audio encoder and an audio decoder. FIG. 7 shows the compact downmix matrix 308 having the significance values, as is shown also in FIG. 6. In addition, FIG. 7 shows an example of a possible template matrix 316 having the same input and output channel configuration 310', 312'. The template matrix, like the compact downmix matrix, includes significance values in the respective template matrix elements 314'. The significance values are distributed among the elements 314' basically in the same way as in the compact downmix matrix, except that the template matrix, which, as mentioned above, is only "similar" to the compact downmix matrix, differs in some of the elements 314'. The template matrix 316 differs from the compact downmix matrix 308 in that in the compact downmix matrix 308 the matrix elements 318 and 320 do not include any gain values, while the template matrix 316 includes in the corresponding matrix elements 318' and 320' the significance value. Thus, the template matrix 316, with regard to the highlighted entries 318' and 320' differs from the compact matrix which needs to be encoded. For achieving an even further efficient coding of the compact downmix matrix, when compared to FIG. 6, the corresponding matrix elements 314, 314' in the two matrices 308, 316 are logically combined to obtain, in a similar way as described with regard to FIG. 6, a one-dimensional vector that can be encoded in a similar way as described above. Each of the matrix elements 314, 314' may be subjected to an XOR operation, more specifically a logical element-wise XOR operation is applied to the compact matrix using the compact template which yields a one-dimensional vector which is converted into a list containing the following run-lengths:

```
0000 0000 0000 0000 0000 0000 0000 0100 0000 0000 0100 0000 0000 0000 0000 (1)
                                        29                 11                           18
```

This list can now be encoded, for example by also using the limited Golomb-Rice coding. When compared to the embodiment described with regard to FIG. 6, it can be seen that this list can be encoded even more efficiently. In the best case, when the compact matrix is identical to the template matrix, the entire vector consists only of zeros and only one run-length number needs to be encoded.

With regard to the use of a template matrix, as it has been described with regard to FIG. 7, it is noted that both the encoder and the decoder need to have a predefined set of such compact templates which is uniquely determined by a set of input and output speakers, in contrast to an input or output configuration which is determined by the list of speakers. This means that the order of input and output speakers is not relevant for determining the template matrix, rather it can be permuted before use to match the order of a given compact matrix.

In the following, as mentioned above, embodiments will be described regarding the encoding of the mixing gains provided in the original downmix matrix which are no longer present in the compact downmix matrix and which need to be encoded and transmitted as well.

FIGS. 8A-G describe an embodiment for encoding the mixing gains. This embodiment makes use of the properties of the sub-matrices which correspond to one or more non-zero entries in the original downmix matrix, according to different combinations of input and output speaker groups, namely groups S (symmetric, L and R), C (center) and A (asymmetric). FIGS. 8A-G describe possible sub-matrices that can be derived from the downmix matrix shown in FIG. 4, according to different combinations of input and output speakers, namely the symmetric speakers L and R, the central speakers C and asymmetric speakers A. In FIGS. 8A-G, the letters a, b, c and d represent arbitrary gain values.

Figure 8A:
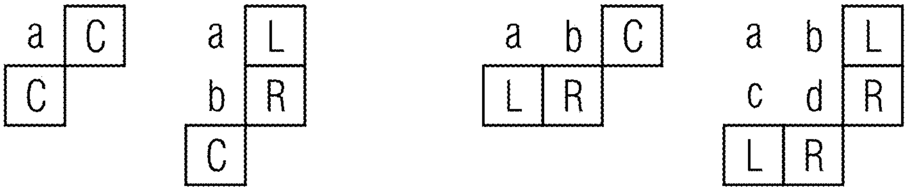
FIG. 8A-G illustrate possible sub-matrices that can be derived from the downmix matrix shown in FIG. 4, according to different combinations of input and output speakers.

FIG. 8A shows four possible sub-matrices as they can be derived from the matrix of FIG. 4. The first one is the sub-matrix defining the mapping of two central channels, for example the speakers C in the input configuration 300 and the speaker C in the output configuration 302, and the gain value "a" is the gain value indicated in the matrix element [1,1] (upper left-hand element in FIG. 4). The second sub-matrix in FIG. 8A represents, for example, mapping two symmetric input channels, for example input channels Lc and Rc, to a central speaker, such as the speaker C, in the output channel configuration. The gain values "a" and "b" are the gain values indicated in the matrix elements [1,2] and [1,3]. The third sub-matrix in FIG. 8A(a) refers to the mapping of a central speaker C, such as speaker Cvr in the input configuration 300 of FIG. 4, to two symmetric channels, such as channels Ls and Rs, in the output configuration 302. The gain values "a" and "b" are the gain values indicated in the matrix elements [4,21] and [5,21]. The fourth sub-matrix in FIG. 8A represents a case where two symmetric channels are mapped, for example channels L, R in the input configuration 300 are mapped to channels L, R in the output configuration 302. The gain values "a" to "d" are the gain values indicated in the matrix elements [2,4], [2,5], [3,4] and [3,5].

Figure 8B:
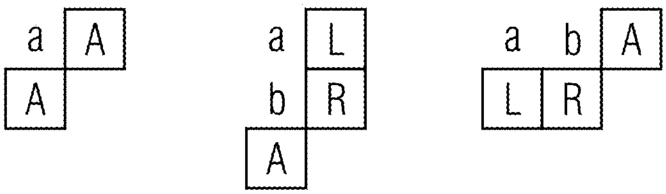

FIG. 8B shows the sub-matrices when mapping asymmetric speakers. The first representation is a sub-matrix obtained by mapping two asymmetric speakers (no example for such a sub-matrix is given in FIG. 4). The second sub-matrix of FIG. 8B refers to the mapping of two symmetric input channels to an asymmetric output channel which, in the embodiment of FIG. 4 is, e.g. the mapping of the two symmetric input channels LFE and LFE2 to the output channel LFE. The gain values "a" and "b" are the gain values indicated in the matrix elements [6,11] and [6,12]. The third sub-matrix in FIG. 8B represents the case where an input asymmetric speaker is matched to a symmetrical pair of output speakers. In the example case there is no asymmetric input speaker.

Figure 8C:
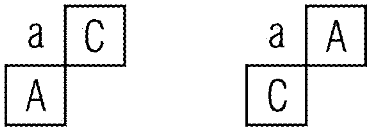

FIG. 8C shows two sub-matrices for mapping central speakers to asymmetric speakers. The first sub-matrix maps an input central speaker to an asymmetric output speaker (no example for such a sub-matrix is given in FIG. 4), and the second sub-matrix maps an asymmetric input speaker to a central output speaker.

In accordance with this embodiment, for each output speaker group, it is checked whether the corresponding column satisfies for all entries the properties of symmetry and separability and this information is transmitted as side information using two bits.

Figure 8D:
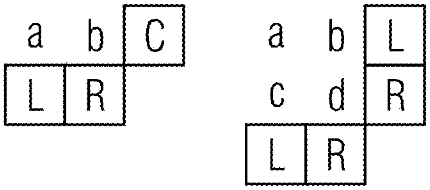
Figure 8E:
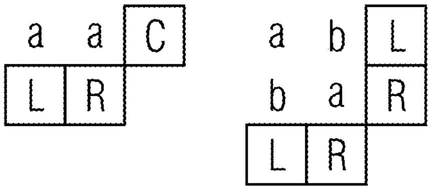
Figure 8F:
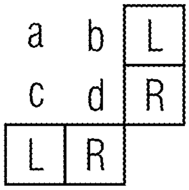
Figure 8G:
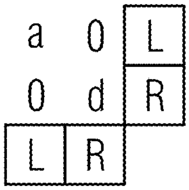

The symmetry property will be described with regard to FIGS. 8D and 8E and means that a S group, comprising L and R speakers, mixes with the same gain into or from a center speaker or an asymmetric speaker, or that the S group gets mixed equally into or from another S group. The just mentioned two possibilities of mixing an S group are depicted in FIG. 8D, and the two sub-matrices correspond to the third and fourth sub-matrices described above with regard to FIG. 8A. Applying the just mentioned symmetry property, namely that the mixing uses the same gain, yields the first sub-matrix shown in FIG. 8E in which an input center speaker C is mapped to the symmetric speaker group S using the same gain value (see, for example, the mapping of the input speaker Cvr to the output speakers Ls and Rs in FIG. 4). This also applies the other way around, for example when looking at the mapping of the input speakers Lc, Rc to the center speaker C of the output channels; here the same symmetry property can be found. The symmetry property further leads to the second sub-matrix shown in FIG. 8E in accordance with which the mixing among symmetry speakers is equal meaning that the mapping of the left speakers and the mapping of the right speakers uses the same gain factor and mapping the left speaker to the right speaker and the right speaker to the left speaker is also done using the same gain value. This is depicted in FIG. 4 for example with regard to the mapping of the input channels L, R to the output channels L, R, with the gain value "a"=1 and the gain value "b"=0.

The separability property means that a symmetric group gets mixed into or from another symmetric group by keeping all signals from the left side to the left and all signals from the right side to the right. This applies for the sub-matrix shown in FIG. 8F which corresponds to the fourth sub-matrix described above with regard to FIG. 8A. Applying the just mentioned separability property leads to the sub-matrix shown in FIG. 8G in accordance with which the left input channel is only mapped to the left output channel and the right input channel is only mapped to the right output channel and there is no "inter-channel" mapping due to the gain factors of zero.

Using the above mentioned two properties, which are encountered in the majority of known downmix matrices, allows to further significantly reduce the actual number of gains that need to be coded and also directly eliminates the coding needed for a large number of zero gains in case of satisfying the separability property. For example, when considering the compact matrix of FIG. 6 including the significance values and when applying the above referenced properties to the original downmix matrix, it can be seen that it is sufficient to define a single gain value for the respective significance values, for example in the way as shown in FIG.

5 in the lower part as, due to the separability and symmetry properties, it is known how the respective gain values associated with the respective significance values need to be distributed among the original downmix matrix upon decoding. Thus, when applying the above described embodiment of FIG. 8 with regard to the matrix shown in FIG. 6, it is sufficient to only provide 19 gain values which need to be encoded and transmitted together with the encoded significance values for allowing the decoder to reconstruct the original downmix matrix.

In the following, an embodiment will be described for dynamically creating a table of gains that may be used for defining the original gain values in the original downmix matrix, for example by a producer of the audio content. In accordance with this embodiment, a table of gains is created dynamically between a minimum gain value (minGain) and a maximum gain value (maxGain) using a specified precision. The table is created such that the most frequently used values and also the more "round" values are arranged closer to the beginning of the table or list than the other values, namely the values not so often used or the not so round values. In accordance with an embodiment, the list of possible values using maxGain, minGain and the precision level can be created as follows:

- add integer multiples of 3 dB, going down from 0 dB to minGain;
- add integer multiples of 3 dB, going up from 3 dB to maxGain;
- add remaining integer multiples of 1 dB, going down from 0 dB to minGain;
- add remaining integer multiples of 1 dB, going up from 1 dB to maxGain;
- stop here if precision level is 1 dB;
- add remaining integer multiples of 0.5 dB, going down from 0 dB to minGain;
- add remaining integer multiples of 0.5 dB, going up from 0.5 dB to maxGain;
- stop here if precision level is 0.5 dB;
- add remaining integer multiples of 0.25 dB, going down from 0 dB to minGain; and
- add remaining integer multiples of 0.25 dB, going up from 0.25 dB to maxGain.

For example, when maxGain is 2 dB and minGain is −6 dB, and precision is 0.5 dB, the following list is crated:

0, −3, −6, −1, −2, −4, −5, 1, 2, −0.5, −1.5, −2.5, −3.5, −4.5, −5.5, 0.5, 1.5.

With regard to the above embodiment it is noted that the invention is not limited to the values indicated above, rather, instead of using integer multiples of 3 dB and starting from 0 dB, other values may be selected and also other values for the precision level may be selected depending on the circumstances.

In general, the list of gain values may be created as follows:

- add integer multiples of a first gain value, between the minimum gain, inclusive, and a starting gain value, inclusive, in decreasing order;
- add remaining integer multiples of the first gain value, between the starting gain value, inclusive, and the maximum gain, inclusive, in increasing order;
- add remaining integer multiples of a first precision level, between the minimum gain, inclusive, and the starting gain value, inclusive, in decreasing order;
- add remaining integer multiples of the first precision level, between the starting gain value, inclusive, and the maximum gain, inclusive, in increasing order;
- stop here if precision level is the first precision level;
- add remaining integer multiples of a second precision level, between the minimum gain, inclusive, and the starting gain value, inclusive, in decreasing order;
- add remaining integer multiples of the second precision level, between the starting gain value, inclusive, and the maximum gain, inclusive, in increasing order;
- stop here if precision level is the second precision level;
- add remaining integer multiples of a third precision level, between the minimum gain, inclusive, and the starting gain value, inclusive, in decreasing order; and
- add remaining integer multiples of the third precision level, between the starting gain value, inclusive, and the maximum gain, inclusive, in increasing order.

In the embodiment above, when the starting gain value is zero, the parts which add remaining values in increasing order and satisfying the associated multiplicity condition will initially add the first gain value or the first or second or third precision level. However, in the general case, the parts which add remaining values in increasing order will initially add the smallest value, satisfying the associated multiplicity condition, in the interval between the starting gain value, inclusive, and the maximum gain, inclusive. Correspondingly, the parts which add remaining values in decreasing order will initially add the largest value, satisfying the associated multiplicity condition, in the interval between the minimum gain, inclusive, and the starting gain value, inclusive.

Considering an example similar to the one above but with a starting gain value=1 dB (a first gain value=3 dB, maxGain=2 dB, minGain=−6 dB and precision level=0.5 dB) yields the following:

Down: 0, −3, −6
Up [empty]
Down: 1, −2, −4, −5
Up 2
Down: 0.5, −0.5, −1.5, −2.5, −3.5, −4.5, −5.5
Up 1.5

To encode a gain value, the gain is looked up in the table and its position inside the table is output. The desired gain will be found because all the gains are previously quantized to the nearest integer multiple of the specified precision of, for example, 1 dB, 0.5 dB or 0.25 dB. In accordance with an embodiment, the positions of the gain values have associated therewith an index, indicating the position in the table and the indexes of the gains can be encoded, for example, using the limited Golomb-Rice coding approach. This results in small indexes to use a smaller number of bits than large indexes and, in this way, the frequently used values or the typical values, like 0 dB, −3 dB or −6 dB will use the smallest number of bits and also the more "round" values, like −4 dB, will use a smaller number of bits that the not so round numbers (for example, −4.5 dB). Thus, by using the above described embodiment not only a producer of the audio content may generate a desired list of gains, but these gains may also be encoded very efficiently so that when applying, in accordance with yet another embodiment, all the above described approaches, a highly efficient coding of downmix matrices can be achieved.

The above described functionality may be part of an audio encoder as it has been described above with regard to FIG. 1, alternatively it can be provided by a separate encoder device that provides the encoded version of the downmix matrix to the audio encoder to be transmitted in the bit stream towards the receiver or decoder.

Upon receiving the encoded compact downmix matrix at the receiver side, in accordance with embodiments a method for decoding is provided which decodes the encoded compact downmix matrix and un-groups (separates) the grouped speakers into single speakers, thereby yielding the original downmix matrix. When the encoding of the matrix includes encoding the significance values and the gain values, during the decoding step, these are decoded so that on the basis of the significance values and on the basis of the desired input/output configuration, the downmix matrix can be reconstructed and the respective decoded gains can be associated to the respective matrix elements of the reconstructed downmix matrix. This may be performed by a separate decoder that yields the completed downmix matrix to the audio decoder which may use it in a format converter, for example, the audio decoder described above with regard to FIGS. 2, 3 and 4.

Thus, the inventive approach as defined above provides also for a system and a method for presenting audio content having a specific input channel configuration to a receiving system having a different output channel configuration, wherein the additional information for the downmix is transmitted together with the encoded bit stream from the encoder side to the decoder side and, in accordance with the inventive approach, due to the very efficient coding of the downmix matrices the overhead is clearly reduced.

In the following a further embodiment implementing the efficient static downmix matrix coding is described. More specifically, an embodiment for a static downmix matrix with optional EQ coding will be described. As also mentioned earlier, one issue related to multichannel audio is to accommodate its real-time transmission, while maintaining compatibility with all the existing available consumer physical speaker setups. One solution is to provide, alongside the audio content in the original production format, downmix side information to generate the other formats which have less independent channels, if needed. Assuming an inputCount input channels and an outputCount output channels, the downmix procedure is specified by a downmix matrix of size inputCount by outputCount. This particular procedure represents a passive downmix, meaning no adaptive signal processing depending on the actual audio content is applied to the input signals or to the downmixed output signals. The inventive approach, in accordance with the embodiment described now, describes a complete scheme for efficient encoding of downmix matrices, including aspects about choosing a suitable representation domain and quantization scheme but also about lossless coding of the quantized values. Each matrix element represents a mixing gain which adjusts the level a given input channel contributes to a given output channel. The embodiment described now aims to achieve unrestricted flexibility by allowing encoding of arbitrary downmix matrixes, with a range and a precision that may be specified by the producer according to his needs. Also an efficient lossless coding is desired, so that typical matrices use a small amount of bits, and departing from typical matrices will only gradually decrease efficiency. This means that the more similar a matrix is to a typical one, the more efficient its coding will be. In accordance with embodiments, the necessitated precision can be specified by the producer as 1, 0.5, or 0.25 dB, to be used for uniform quantization. The values of the mixing gains may be specified between a maximum of +22 dB to a minimum of −47 dB inclusive, and also include the value −∞ (0 in linear domain). The effective value range that is used in the downmix matrix is indicated in the bit stream as a maximum gain value maxGain and a minimum gain value minGain, therefore not wasting any bits on values which are not actually used while not limiting flexibility.

Assuming that an input channel list and also an output channel list is available which provide geometrical information about each speaker, such as the azimuth and elevation angles and optionally the speaker conventional name, for example according to prior art references [6] or [7], an algorithm for encoding a downmix matrix, in accordance with embodiments, may be as shown in table 1 below:

TABLE 1

Syntax of DownmixMatrix

| Syntax | No. of bits | Mnemonic |
|---|---|---|
| DownmixMatrix(inputConfig, inputCount, outputConfig, outputCount) | | |
| { | | |
| equalizerpresent; | 1 | uimsbf |
| if (equalizerpresent) { | | |
| EqualizerConfig(inputConfig, inputCount); | | |
| } | | |
| precision Level: | 2 | uimsbf |
| maxGain = escapedValue(3, 4, 0); | | |
| minGain = escapedValue(4, 5, 0) + 1; | | |
| ConvertToCompactConfig(inputConfig, inputCount); | | |
| ConvertToCompactConfig(outputConfig, outputCount); | | |
| isAllSeparable; | 1 | uimsbf |
| if (!isAllSeparable) { | | |
| for (i = 0; i < compactOutputCount; i++) { | | |
| if (compactOutputConfig[i].pairType == SYMMETRIC) { | | |
| isSeparable[i]; | 1 | uimsbf |
| } | | |
| } | | |
| } else { | | |
| for (i = 0; i < compactOutputCount; i++) { | | |
| if (compactOutputConfig[i].pairType == SYMMETRIC) { | | |
| isSeparable[i] = 1; | | |
| } | | |
| } | | |
| } | | |
| isAllSymmetric; | 1 | uimsbf |
| if (!isAllSymmetric) { | | |
| for (i = 0; i < compactOutputCount; i++) { | | |

TABLE 1-continued

Syntax of DownmixMatrix

| Syntax | No. of bits | Mnemonic |
|---|---|---|
| isSymmetric[i]; | 1 | uimsbf |
| } | | |
| } else { | | |
| for (i = 0; i < compactOutputCount; i++) { | | |
| isSymmetric[i] = 1; | | |
| } | | |
| mixLFEOnlyToLFE; | 1 | uimsbf |
| rawCodingCompactMatrix; | 1 | uimsbf |
| if (rawCodingCompactMatrix) { | | |
| for (i = 0; i < compactInputCount; i++) { | | |
| for (j = 0; j < compactOutputCount; j++) { | | |
| if (!mixLFEOnlyToLFE \|\| (compactInputConfig[i].isLFE == compactOutputConfig[j].isLFE)) { | | |
| compactDownmixMatrix[i][j]; | 1 | uimsbf |
| } else { | | |
| compactDownmixMatrix[i][j] = 0; | | |
| } | | |
| } | | |
| } | | |
| } else { | | |
| if (mixLFEOnlyToLFE) { | | |
| compactInputLFECount = 0; | | |
| compactOutputLFECount = 0; | | |
| for (i = 0; i < compactInputCount; i++) { | | |
| if (compactInputConfig[i].isLFE) compactInputLFECount++; | | |
| } | | |
| for (i = 0; i < compactOutputCount; i++) { | | |
| if (compactOutputConfig[i].isLFE) compactOutputLFECount++; | | |
| } | | |
| totalCount = (compactInputCount − compactInputLFECount) * (compactOutputCount − compactOutputLFECount); | | |
| } else { | | |
| totalCount = compactInputCount * compactOutputCount; | | |
| } | | |
| useCompactTemplate: | 1 | uimsbf |
| n = 3; if (totalCount >= 256) n = 4; | | |
| runLGRParam: | n | uimsbf |
| count = 0; | | |
| flatCompactMatrix[totalCount + 1]; | | |
| while (count < totalCount) { | | |
| zeroRunLength; /* limited Golomb-Rice using runLGRparam */ | varies | bslbf |
| flatCompactMatrix[count .. count + zeroRunLength] = {0, ..., 0, 1}; | | |
| count += zeroRunLength + 1; | | |
| } | | |
| count = 0; | | |
| for (i = 0; i < compactInputCount; i++) { | | |
| for (j = 0; j < compactOutputCount; j++) { | | |
| if (mixLFEOnlyToLFE && compactInputConfig[i].isLFE && compactOutputConfig[j].isLFE) { | | |
| compactDownmixMatrix[i][j]; | 1 | uimsbf |
| } else if (mixLFEOnlyToLFE && (compactInputConfig[i].isLFE ^ compactOutputConfig[j].isLFE)) { | | |
| compactDownmixMatrix[i][j] = 0; | | |
| } else { | | |
| compactDownmixMatrix[i][j] = flatCompactMatrix[count++]; | | |
| } | | |
| } | | |
| } | | |
| if (useCompactTemplate) { | | |
| compactTemplate = FindCompactTemplate(inputConfig, inputCount, outputConfig, outputCount); | | |
| for (i = 0; i < compactInputCount; i++) { | | |
| for (j = 0; j < compactOutputCount; j++) { | | |
| compactDownmixMatrix[i][j] ^= compactTemplate[i][j]; | | |
| } | | |
| } | | |
| } | | |
| } | 1 | uimsbf |

TABLE 1-continued

| Syntax of DownmixMatrix | | |
|---|---|---|
| Syntax | No. of bits | Mnemonic |
| fullForAsymmetricInputs; | 1 | uimsbf |
| rawCodingNonzeros; | | |
| if (!rawCodingNonzeros) { | 3 | uimsbf |
| gainLGRParam; | | |
| generateGainTable(maxGain, minGain, precisionLevel); | | |
| } | | |
| for (i = 0; i < compactInputCount; i++) { | | |
| iType = compactInputConfig[i].pairType; | | |
| for (j = 0; j < compactOutputCount; j++) { | | |
| oType = compactOutputConfig[j].pairType; | | |
| i1 = compactInputConfig[i].originalPosition; | | |
| o1 = compactOutputConfig[j].originalPosition; | | |
| if ((iType != SYMMETRIC) && (oType != SYMMETRIC)) { | | |
| downmixMatrix[i1][o1] = 0.0; | | |
| if (!compactDownmixMatrix[i][j]) continue; | | |
| downmixMatrix[i1][o1] = DecodeGainValue( ); | | |
| } else if (iType != SYMMETRIC) { | | |
| o2 = compactOutputConfig[j].SymmetricPair.originalPosition; | | |
| downmixMatrix[i1][o1] = 0.0; | | |
| downmixMatrix[i1][o2] = 0.0; | | |
| if (!compactDownmixMatrix[i][j]) continue; | | |
| downmixMatrix[i1][o1] = DecodeGainValue( ); | | |
| useFull = (iType == ASYMMETRIC) && | | |
| fullForAsymmetricinputs; | | |
| if (isSymmetric[j] && !useFull) { | | |
| downmixMatrix[i1][o2] = downmixMatrix[i1][o1]; | | |
| } else { | | |
| downmixMatrix[i1][o2] = DecodeGainValue( ); | | |
| } | | |
| } else if (oType != SYMMETRIC) { | | |
| i2 = compactInputConfig[i].SymmetricPair.originalPosition; | | |
| downmixMatrix[i1][o1] = 0.0; | | |
| downmixMatrix[i2][o1] = 0.0; | | |
| if (!compactDownmixMatrix[i][j]) continue; | | |
| downmixMatrix[i1][o1] = DecodeGainValue( ); | | |
| if (isSymmetric[j]) { | | |
| downmixMatrix[i2][o1] = downmixMatrix[i1][o1]; | | |
| } else { | | |
| downmixMatrix[i2][o1] = DecodeGainValue( ); | | |
| } | | |
| } else { | | |
| i2 = compactInputConfig[i].SymmetricPair.originalPosition; | | |
| o2 = compactOutputConfig[j].SymmetricPair.originalPosition; | | |
| downmixMatrix[i1][o1] = 0.0; | | |
| downmixMatrix[i1][o2] = 0.0; | | |
| downmixMatrix[i2][o1] = 0.0; | | |
| downmixMatrix[i2][o2] = 0.0; | | |
| if (!compactDownmixMatrix[i][j]) continue; | | |
| downmixMatrix[i1][o1] = DecodeGainValue( ); | | |
| if (isSeparable[j] && isSymmetric[j]) { | | |
| downmixMatrix[i2][o2] = downmixMatrix[i1][o1]; | | |
| } else if (!isSeparable[j] && isSymmetric[j]) { | | |
| downmixMatrix[i1][o2] = DecodeGain Value( ); | | |
| downmixMatrix[i2][o1] = downmixMatrix[i1][o2]; | | |
| downmixMatrix[i2][o2] = downmixMatrix[i1][o1]; | | |
| } else if (isSeparable[j] && !isSymmetric[j]) { | | |
| downmixMatrix[i2][o2] = DecodeGain Value( ); | | |
| } else { | | |
| downmixMatrix[i1][o2] = DecodeGain Value( ); | | |
| downmixMatrix[i2][o2] = DecodeGain Value( ); | | |
| downmixMatrix[i2][o2] = DecodeGain Value( ); | | |
| } | | |
| } | | |
| } | | |
| } | | |
| } | | |

An algorithm for decoding gain values, in accordance with embodiments, may be as shown in table 2 below:

TABLE 2

Syntax of DecodeGainValue

| Syntax | No. of bits | Mnemonic |
|---|---|---|
| DecodeGainValue( ) | | |
| { | | |
| if (rawCodingNonzeros) { | | |
| nAlphabet = (maxGain − minGain) * 2 ^ | | |
| precision Level + 1; | | |
| gainValueIndex = ReadRange(nAlphabet); | | |
| gainValue = maxGain − gainValueIndex / 2 ^ | | |
| precisonLevel; | | |
| } else { | | |
| gainValueIndex; /* limited Golomb-Rice using | varies | bslbf |
| gainLGRParam 7 | | |
| gainValue = gainTable[gainValueIndex]; | | |
| } | | |
| } | | |

An algorithm for defining the read range function, in accordance with embodiments, may be as shown in table 3 below:

TABLE 3

Syntax of Read Range

| Syntax | No. of bits | Mnemonic |
|---|---|---|
| ReadRange(alphabetSize) | | |
| { | | |
| nBits = floor(log2(alphabetSize)); | | |
| nUnused = 2 ^ (nBits + 1) − alphabetSize; | nBits | uimsbf |
| range; | | |
| if (range >= nUnused) { | | |
| range Extra: | 1 | uimsbf |
| range = range * 2 − nUnused + rangeExtra; | | |
| } | | |
| return range; | | |
| } | | |

An algorithm for defining the equalizer configuration, in accordance with embodiments, may be as shown in table 4 below:

TABLE 4

Syntax of EqualizerConfig

| Syntax | No. of bits | Mnemonic |
|---|---|---|
| EqualizerConfig(inputConfig, inputCount) | | |
| { | | |
| numEqualizers = escapedValue(3, 5, 0) + 1; | | |
| eqPrecisionLevel; | 2 | uimsbf |
| eqExtended Range; | 1 | uimsbf |
| for (i = 0; i < numEqualizers; i++) { | | |
| numSections = escapedValue(2, 4, 0) + 1; | | |
| lastCenterFreqP10 = 0; | | |
| lastCenterFreqLd2 = 10; | | |
| maxCenterFreqLd2 = 99; | | |
| for (j = 0; j < numSections; j++) { | | |
| centerFreqP10 = lastCenterFreqP10 + ReadRange(4 − lastCenterFreqP10); | | |
| if (centerFreqP10 > lastCenterFreqP10) lastCenterFreqLd2 = 10; | | |
| if (centerFreqP10 == 3) maxCenterFreqLd2 = 24; | | |
| centerFreqLd2 = lastCenterFreqLd2 + | | |
| ReadRange(1 + maxCenterFreqLd2 − lastCenterFreqLd2); | | |
| | 5 | uimsbf |
| qFactorIndex; | | |
| if (qFactorIndex > 19) { | 3 | uimsbf |
| qFactorExtra; | | |
| } | | |
| cgBits = 4 + eqExtendedRange + eqPrecisionLevel; | cgBit | uimsbf |
| centerGainIndex; | s | |
| } | | |
| sgBits = 4 + eqExtendedRange + min(eqPrecisionLevel + 1, 3); | | uimsbf |
| scalingGainIndex; | sgBit | |
| } | s | |
| for (i = 0; i < inputCount; i++) { | | uimsbf |
| hasEqualizer[i]; | | |
| if (hasEqualizer[i]) { | 1 | |
| equalizerIndex[i] = ReadRange(numEqualizers); | | |
| } | | |
| } | | |
| } | | |

The elements of the downmix matrix, in accordance with embodiments, may be as shown in table 5 below:

TABLE 5

Elements of DownmixMatrix

| Field | Description/Values |
|---|---|
| paramConfig, inputConfig, outputConfig | Channel configuration vectors specifying the information about each speaker. Each entry, paramConfig[i], is a structure with the members:<br>AzimuthAngle, the absolute value of the speaker azimuth angle;<br>AzimuthDirection, the azimuth direction, 0 (left) or 1 (right);<br>ElevationAngle, the absolute value of the speaker elevation angle;<br>Elevation Direction, the elevation direction, 0 (up) or 1 (down);<br>alreadyUsed, indicates whether the speaker is already part of a group;<br>isLFE, indicates whether the speaker is a LFE speaker. |
| paramCount, inputCount, outputCount | Number of speakers in the corresponding channel configuration vectors |
| compactParamConfig, compactInputConfig, compactOutputConfig | Compact channel configuration vectors specifying the information about each speaker group. Each entry, compactParamConfig[i], is a structure with the members:<br>pairType, type of the speaker group, which can be SYMMETRIC (a symmetric pair of two speakers), CENTER, or ASYMMETRIC;<br>isLFE, indicates whether the speaker group consists of LFE speakers;<br>originalPosition, position in the original channel configuration of the first speaker, or the only speaker, in the group;<br>symmetricPair.originalPosition, position in the original channel configuration of the second speaker in the group, for SYMMETRIC groups only. |
| compactParamCount, compactInputCount, compactOutputCount | Number of speaker groups in the corresponding compact channel configuration vectors |
| equalizerpresent | Boolean indicating whether equalizer information that is to be applied to the input channels is present |
| precisionLevel | Precision used for uniform quantization of the gains:<br>0 = 1 dB, 1 = 0.5 dB, 2 = 0.25 dB, 3 reserved |
| maxGain | Maximum actual gain in the matrix, expressed in dB:<br>possible values from 0 to 22, in linear 1. . . 12.589 |
| minGain | Minimum actual gain in the matrix, expressed in dB:<br>possible values from −1 to −47, in linear 0.891 . . . 0.004 |
| isAllSeparable | Boolean indicating whether all the output speaker groups satisfy the separability property |
| isSeparable[i] | Boolean indicating whether the output speaker group with index i satisfies the separability property |
| isAllSymmetric | Boolean indicating whether all the output speaker groups satisfy the symmetry property |
| isSymmetric[i] | Boolean indicating whether the output speaker group with index i satisfies the symmetry property |
| mixLFEOnlyToLFE | Boolean indicating whether the LFE speakers are mixed only to LFE speakers and, at the same time, the non-LFE speakers are mixed only to non-LFE speakers |
| rawCodingCompactMatrix | Boolean indicating whether compactDownmixMatrix is coded raw (using one bit per entry) or it is coded using run-length coding followed by limited Golomb-Rice |
| compactDownmixMatrix[i][j] | An entry in compactDownmixMatrix corresponding to input speaker group i and output speaker group j, indicating whether any of the associated gains is nonzero:<br>0 = all gains are zero, 1 = at least one gain is nonzero |
| useCompaetTemplate | Boolean indicating whether to apply an element-wise XOR to compactDownmixMatrix with a predefined compact template matrix, to improve the efficiency of the run-length coding |
| runLGRParam | Limited Golomb-Rice parameter used to code the zero run-lengths in the linearized flatCompactMatrix |
| flatCompactMatrix | Linearized version of compactDownmixMatrix with the predefined compact template matrix already applied;<br>When mixLFEOnlyToLFE is enabled, it does not include the entries known to be zero (due to mixing between non-LFE and LFE) or those used for LFE to LFE mixing |
| compactTemplate | Predefined compact template matrix, having “typical” entries, which is XORed element-wise to compactDownmixMatrix, in order to improve coding efficiency by creating mostly zero value entries |
| zeroRunLength | The length of a zero run followeed by a one, in the flatCompactMatrix, which is coded with limited Golomb-Rice coding, using the parameter runLGRParam |
| fullForAsymmetricInputs | Boolean indicating whether to ignore the symmetry property for every asymmetric input speaker group; |

TABLE 5-continued

| Elements of DownmixMatrix | |
|---|---|
| Field | Description/Values |
| | When enabled, every asymmetric input speaker group will have two gain values decoded for each symmetric output speaker group with index i, regardless of isSymmetric[i] |
| gainTable | Dynamically generated gain table which contains the list of all possible gains between minGain and maxGain with precision precision Level |
| rawCodingNonzeros | Boolean indicating whether the nonzero gain values are coded raw (uniform coding, using the ReadRange function) or their indexes in the gainTable list are coded using limited Golomb-Rice coding |
| gainLGRParam | Limited Golomb-Rice parameter used to code the nonzero gain indexes, computed by searching each gain in the gainTable list |

Golomb-Rice coding is used to code any non-negative integer n≥0, using a given non-negative integer parameter p≥0 as follows: first code the number $h=\lfloor n/2^p \rfloor$ using unary coding, as h one bits followed by a terminating zero bit; then code the number $l=n-h\cdot 2^p$ uniformly using p bits.

Limited Golomb-Rice coding is a trivial variant used when it is known in advance that n<N, for a given integer N≥1. It does not include the terminating zero bit when coding the maximum possible value of h, which is $h_{max}=\lfloor (N-1)/2^p \rfloor$. More exactly, to encode $h=h_{max}$ we write only h one bits, but not the terminating zero bit, which is not needed because the decoder can implicitly detect this condition.

The function ConvertToCompactConfig(paramConfig, paramCount) described below is used to convert the given paramConfig configuration consisting of paramCount speakers into the compact compactParamConfig configuration consisting of compactParamCount speaker groups. The compactParamConfig[i].pairType field can be SYMMETRIC (S), when the group represents a pair of symmetric speakers, CENTER (C), when the group represents a center speaker, or ASYMMETRIC (A), when the group represents a speaker without a symmetric pair.

```
ConvertToCompactConfig(paramConfig, paramCount)
{
  for (i = 0; i < paramCount; ++i) {
    paramConfig[i].alreadyUsed = 0;
  }
  idx = 0;
  for (i = 0; i < paramCount; ++i) {
    if (paramConfig[i].alreadyUsed) continue;
    compactParamConfig[idx].isLFE = paramConfig[i].isLFE;
    if ((paramConfig[i].AzimuthAngle == 0) ||
        (paramConfig[i].AzimuthAngle == 180°) {
      compactParamConfig[idx].pairType = CENTER;
      compactParamConfig[idx].originalPosition = i;
    } else {
      j = SearchForSymmetricSpeaker(paramConfig, paramCount, i);
      if (j != -1) {
        compactParamConfig[idx].pairType = SYMMETRIC;
        if (paramConfig.AzimuthDirection == 0) {
          compactParamConfig[idx].originalPosition = i;
          compactParamConfig[idx].symmetricPair.originalPosition = j;
        } else {
          compactParamConfig[idx].originalPosition = j;
          compactParamConfig[idx].symmetricPair.originalPosition = i;
        }
        paramConfig[j].alreadyUsed = 1;
      } else {
        compactParamConfig[idx].pairType = ASYMMETRIC;
        compactParamConfig[idx].originalPosition = i;
      }
    }
    idx++;
  }
  compactParamCount = idx;
}
```

The function FindCompactTemplate(inputConfig, inputCount, outputConfig, outputCount) is used to find a compact template matrix matching the input channel configuration represented by inputConfig and inputCount, and the output channel configuration represented by outputConfig and outputCount.

The compact template matrix is found by searching in a predefined list of compact template matrices, available at both the encoder and decoder, for the one with the same the set of input speakers as inputConfig and the same set of output speakers as outputConfig, regardless of the actual speaker order, which is not relevant. Before returning the found compact template matrix, the function may need to reorder its lines and columns to match the order of the speakers groups as derived from the given input configuration and the order of the speaker groups as derived from the given output configuration.

If a matching compact template matrix is not found, the function shall return a matrix having the correct number of lines (which is the computed number of input speaker groups) and columns (which is the computed number of output speaker groups), which has for all entries the value one (1).

The function SearchForSymmetricSpeaker(paramConfig, paramCount, i) is used to search the channel configuration represented by paramConfig and paramCount for the symmetric speaker corresponding to the speaker paramConfig[i]. This symmetric speaker, paramConfig[i], shall be situated after the speaker paramConfig[i], therefore j can be in the range i+1 to paramConfig−1, inclusive. Additionally, it shall not be already part of a speaker group, meaning that paramConfig[i].alreadyUsed has to be false.

The function readRange( ) is used to read a uniformly distributed integer in the range 0 . . . alphabetSize−1 inclusive, which can have a total of alphabetSize possible values. This may be simply done reading ceil(log 2(alphabetSize)) bits, but without taking advantage of the unused values. For example, when alphabetSize is 3, the function will use just one bit for integer 0, and two bits for integers 1 and 2.

The function generateGain Table(maxGain, minGain, precisionLevel) is used to dynamically generate the gain table gainTable which contains the list of all possible gains between minGain and maxGain with precision precisionLevel. The order of the values is chosen so that the most frequently used values and also more "round" values would be typically closer to the beginning of the list. The gain table with the list of all possible gain values is generated as follows:

- add integer multiples of 3 dB, going down from 0 dB to minGain;
- add integer multiples of 3 dB, going up from 3 dB to maxGain;
- add remaining integer multiples of 1 dB, going down from 0 dB to minGain;
- add remaining integer multiples of 1 dB, going up from 1 dB to maxGain;
- stop here if precisionLevel is 0 (corresponding to 1 dB);
- add remaining integer multiples of 0.5 dB, going down from 0 dB to minGain;
- add remaining integer multiples of 0.5 dB, going up from 0.5 dB to maxGain;
- stop here if precisionLevel is 1 (corresponding to 0.5 dB);
- add remaining integer multiples of 0.25 dB, going down from 0 dB to minGain;
- add remaining integer multiples of 0.25 dB, going up from 0.25 dB to maxGain.

For example, when maxGain is 2 dB and minGain is-6 dB, and precisionLevel is 0.5 dB, we create the following list: 0, −3, −6, −1, −2, −4, −5, 1, 2, −0.5, −1.5, −2.5, −3.5, −4.5, −5.5, 0.5, 1.5.

The elements for the equalizer configuration, in accordance with embodiments, may be as shown in table 6 below:

TABLE 6

Elements of EqualizerConfig

| Field | Description/Values |
|---|---|
| numEqualizers | Number of different equalizer filters present |
| eqPrecisionLevel | Precision used for uniform quantization of the gains: 0 = 1 dB, 1 = 0.5 dB, 2 = 0.25 dB, 3 = 0.1 dB |
| eqExtendedRange | Boolean indicating whether to use an extended range for the gains; if enabled, the available range is doubled |
| numSections | Number of sections of an equalizer filter, each one being a peak filter |
| centerFreqLd2 | The leading two decimal digits of the center frequency for a peak filter; the maximum range is 10 . . . 99 |
| centerFreqP10 | Number of zeros to be appended to centerFreqLd2; the maximum range is 0 . . . 3 |
| qFactorIndex | Quality factor index for a peak filter |
| qFactorExtra | Extra bits for decoding a quality factor larger than 1.0 |
| centerGainIndex | Gain at the center frequency for a peak filter |
| scalingGainIndex | Scaling gain for an equalizer filter |
| hasEqualizer[i] | Boolean indicating whether the input channel with index i has an equalizer associated to it |
| eqalizerIndex[i] | The index of the equalizer associated with the input channel with index i |

In the following aspects of the decoding process in accordance with embodiments will be described, starting with the decoding of the downmix matrix.

The syntax element DownmixMatrix( ) contains the downmix matrix information. The decoding first reads the equalizer information represented by the syntax element EqualizerConfig( ), if enabled. The fields precisionLevel, maxGain, and minGain are then read. The input and output configurations are converted to compact configurations using the function ConvertToCompactConfig( ). Then, the flags indicating if the separability and symmetry properties are satisfied for each output speaker group are read.

The significance matrix compactDownmixMatrix is then read, either a) raw using one bit per entry, or b) using the limited Golomb-Rice coding of the run lengths, and then copying the decoded bits from flactCompactMatrix to compactDownmixMatrix and applying the compactTemplate matrix.

Finally, the nonzero gains are read. For each nonzero entry of compactDownmixMatrix, depending on the field pairType of the corresponding input group and the field pairType of the corresponding output group, a sub-matrix of size up to 2 by 2 has to be reconstructed. Using the separability and symmetry associated properties, a number of gain values are read using the function DecodeGain Value( ). A gain value can be coded uniformly, by using the function ReadRange( ), or using the limited Golomb-Rice coding of the indices of the gain in the gainTable table, which contains all the possible gain values.

Now, aspects of the decoding of the equalizer configuration will be described. The syntax element Equalizer Config( ) contains the equalizer information that is to be applied to the input channels. A number of numEqualizers equalizer filters is first decoded and thereafter selected for specific input channels using eqIndex[i]. The fields eqPrecisionLevel and eqExtendedRange indicate the quantization precision and the available range of the scaling gains and of the peak filter gains.

Each equalizer filter is a serial cascade consisting in a number of numSections of peak filters and one scalingGain. Each peak filter is fully defined by its centerFreq, qualityFactor, and centerGain.

The centerFreq parameters of the peak filters which belong to a given equalizer filter have to be given in non-decreasing order. The parameter is limited to 10 . . . 24000 Hz inclusive, and it is calculated as $$centerFreq = centerFreqLd2 \times 10^{centerFreqP10}$$

The qualityFactor parameter of the peak filter can represent values between 0.05 and 1.0 inclusive with a precision of 0.05 and from 1.1 to 11.3 inclusive with a precision of 0.1 and it is calculated as $$qualityFactor = \begin{cases} 0.05 \times (qFactorIndex + 1), & \text{if } qFactorIndex \leq 19 \\ 1.0 + 0.1 \times [(qFactorIndex - 19) \times 8 + FactorExtra], & \text{otherwise} \end{cases}$$

The vector eqPrecisions is introduced which gives the precision in dB corresponding to a given eqPrecisionLevel, and the eqMinRanges and eqMaxRanges matrices which give the minimum and maximum values in dB for the gains corresponding to a given eqExtendedRange and eqPrecisionLevel.

```
eqPrecisions[4] = {1.0, 0.5, 0.25, 0.1};
eqMinRanges[2][4] = {{-8.0, -8.0, -8.0, -6.4}, {-16.0, -16.0, -16.0, -12.8}};
eqMaxRanges[2][4] = {{7.0, 7.5, 7.75, 6.3}, {15.0, 15.5, 15.75, 12.7}};
```

The parameter scalingGain uses the precision level min (eqPrecisionLevel+1,3), which is the next better precision level if not already the last one. The mappings from the fields centerGainIndex and scalingGainIndex to the gain parameters centerGain and scalingGain are calculated as $$centerGain = eqMinRanges[eqExtendedRange][eqPresisionLevel] + eqPrecisions[eqPrecisionLevel] \times centerGainIndex$$

$$scalingGain = eqMinRanges[eqExtendedRange][\min(eqPresisionLevel + 1, 3)] + eqPresision[\min(eqPresisionLevel + 1, 3)] \times scalingGainIndex$$

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a harddisk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or programmed to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Information technology—Coding of audio-visual objects—Part 3: Audio, AMENDMENT 4: New levels for AAC profiles, ISO/IEC 14496-3:2009/DAM 4, 2013.
[2] ITU-R BS.775-3, “Multichannel stereophonic sound system with and without accompanying picture,” Rec., International Telecommunications Union, Geneva, Switzerland, 2012.
[3] K. Hamasaki, T. Nishiguchi, R. Okumura, Y. Nakayama and A. Ando, “A 22.2 Multichannel Sound System for Ultrahigh-definition TV (UHDTV),” SMPTE Motion Imaging J., pp. 40-49, 2008.
[4] ITU-R Report BS.2159-4, “Multichannel sound technology in home and broadcasting applications”, 2012.
[5] Enhanced audio support and other improvements, ISO/IEC 14496-12:2012 PDAM 3, 2013.
[6] International Standard ISO/IEC 23003-3:2012, Information technology-MPEG audio technologies—Part 3: Unified Speech and Audio Coding, 2012.
[7] International Standard ISO/IEC 23001-8:2013, Information technology-MPEG systems technologies—Part 8: Coding-independent code points, 2013.

The invention claimed is:

1. A method, comprising:

decoding an encoded downmix matrix for obtaining a decoded downmix matrix, the decoded downmix matrix for mapping a plurality of input channels of an audio content to a plurality of output channels, the input channels and the output channels being associated with respective speakers at predetermined positions relative to a listener position, and wherein a downmix matrix is encoded to obtain the encoded downmix matrix by exploiting a symmetry of speaker pairs of the plurality of input channels and a symmetry of speaker pairs of the plurality of output channels, wherein respective pairs of the input channels and the output channels in the downmix matrix have associated respective mixing gains for adapting a level by which a given input channel of the input channels contributes to a given output channel of the output channels, wherein decoding the encoded downmix matrix comprises decoding from encoded information representing the encoded downmix matrix:

encoded significance values for obtaining decoded significance values, wherein respective decoded significance values are assigned to pairs of symmetric speaker groups of the input channels and symmetric speaker groups of the output channels, wherein a decoded significance value indicates if a mixing gain for one or more of the input channels is zero or not;

encoded mixing gains obtaining mixing gains; and information indicating in the downmix matrix for each group of the output channels whether a symmetry property and a separability property are satisfied, wherein the symmetry property indicates that a group of the output channels is mixed with the same gain from a single input channel or that a group of the output channels is mixed equally from a group of the input channels, and wherein the separability property indicates that a group of the output channels is mixed from a group of the input channels such that a left input channel is only mapped to a left output channel and a right input channel is only mapped to a right output channel.

2. The method of claim 1, wherein the decoded significance values comprise a first value indicative of a mixing gain of zero and a second value indicative of a mixing gain not being zero, and the method further comprising:

decoding a one-dimensional vector using a run-length scheme, the one-dimensional vector concatenating the decoded significance values in a predefined order.

3. The method of claim 2, wherein the one-dimensional vector comprises a list containing run-lengths, and wherein a run-length comprises a number of consecutive first values terminated by the second value.

4. The method of claim 2, wherein the run-lengths scheme comprises a Golomb-Rice coding or a limited Golomb-Rice coding.

5. The method of claim 1, wherein for groups of the output channels satisfying the symmetry property and the separability property a single mixing gain is provided.

6. A non-transitory computer-readable storage medium storing instructions which, when executed by a processor, cause the processor to carry out a method comprising:

decoding an encoded downmix matrix for obtaining a decoded, the decoded downmix matrix for mapping a plurality of input channels of an audio content to a plurality of output channels, the input channels and the output channels being associated with respective speakers at predetermined positions relative to a listener position, and wherein a downmix matrix is encoded to obtain the encoded downmix matrix by exploiting a symmetry of speaker pairs of the plurality of input channels and a symmetry of speaker pairs of the plurality of output channels, wherein respective pairs of the input channels and the output channels in the downmix matrix have associated respective mixing gains for adapting a level by which a given input channel of the input channels contributes to a given output channel of the output channels, and wherein decoding the encoded downmix matrix comprises decoding from encoded information representing the encoded downmix matrix:

encoded significance values for obtaining decoded significance values, wherein respective decoded significance values are assigned to pairs of symmetric speaker groups of the input channels and symmetric speaker groups of the output channels, wherein a decoded significance value indicates if a mixing gain for one or more of the input channels is zero or not;

encoded mixing gains for obtaining the mixing gains; and information indicating in the downmix matrix for each group of the output channels whether a symmetry property and a separability property are satisfied, wherein the symmetry property indicates that a group of the output channels is mixed with the same gain from a single input channel or that a group of the output channels is mixed equally from a group of the input channels; and wherein the separability property indicates that a group of the output channels is mixed from a group of the input channels such that a left input channel is only mapped to a left output channel and a right input channel is only mapped to a right output channel.

7. A non-transitory computer-readable storage medium storing instructions which, when executed by a processor, cause the processor to carry out a method, the method comprising:

encoding a downmix matrix, the downmix matrix mapping a plurality of input channels of an audio content to a plurality of output channels, the input channels and the output channels being associated with respective speakers at predetermined positions relative to a listener position, wherein encoding the downmix matrix comprises exploiting a symmetry of speaker pairs of the plurality of input channels and a symmetry of speaker pairs of the plurality of output channels and wherein respective pairs of the input channels and the output channels in the downmix matrix have associated respective mixing gains for adapting a level by which a given input channel of the input channels contributes to a given output channel of the output channels, wherein encoding the downmix matrix comprises encoding significance values, wherein respective significance values are assigned to pairs of symmetric speaker groups of the input channels and symmetric speaker groups of the output channels, wherein a significance value indicates if a mixing gain for one or more of the input channels is zero or not; and wherein encoding the downmix matrix comprises encoding information indicating in the downmix matrix for each group of the output channels whether a symmetry property and a separability property are satisfied;

wherein the symmetry property indicates that a group of the output channels is mixed with the same gain from a single output channel or that a group of the output channels is mixed equally from a group of the input channels, and wherein the separability property indicates that a group of the output channels is mixed from a group of the input channels such that a left input channel is only mapped to a left output channel and a right input channel is only mapped to a right output channel.

8. An encoder for encoding a downmix matrix, the downmix matrix mapping a plurality of input channels of an audio content to a plurality of output channels, the input channels and the output channels being associated with respective speakers at predetermined positions relative to a listener position, the encoder comprising:

a processor configured to encode the downmix matrix, wherein encoding the downmix matrix comprises exploiting a symmetry of speaker pairs of the plurality of input channels and a symmetry of speaker pairs of the plurality of output channels, wherein respective pairs of the input channels and the output channels in the downmix matrix have associated respective mixing gains for adapting a level by which a given input channel of the input channels contributes to a given output channel of the output channels, wherein, for encoding the downmix matrix, the processor is configured to encode significance values, wherein respective significance values are assigned to pairs of symmetric speaker groups of the input channels and symmetric speaker groups of the output channels, wherein a significance value indicates if a mixing gain for one or more of the input channels is zero or not, and wherein for encoding the downmix matrix, the processor is configured to encode information indicating in the downmix matrix for each group of the output channels whether a symmetry property and a separability property is are satisfied, wherein the symmetry property indicates that a group of the output channels is mixed with the same gain from a single input channel or that a group of the output channels is mixed equally from a group of the input channels, and wherein the separability property indicates that a group of the output channels is mixed from a group of the input channels such that a left input channel is only mapped to a left output channel and a right input channel is only mapped to a right output channel.

9. The encoder of claim 8, wherein the encoder is an audio encoder for encoding an audio signal.

10. A decoder, comprising:

a processor configured to decode an encoded downmix matrix for obtaining a decoded downmix matrix, the decoded downmix matrix mapping a plurality of input channels of audio content to a plurality of output channels, the input channels and the output channels being associated with respective speakers at predetermined positions relative to a listener position, and wherein a downmix matrix is encoded by exploiting the symmetry of speaker pairs of the plurality of input channels and the symmetry of speaker pairs of the plurality of output channels, wherein respective pairs of the input channels and the output channels in the downmix matrix have associated respective mixing gains for adapting a level by which a given input channel of the input channels contributes to a given output channel of the output channels, wherein, for decoding the encoded downmix matrix, the processor is configured to decode from the encoded information representing the encoded downmix matrix encoded significance values for obtaining decoded significance values, wherein respective decoded significance values are assigned to pairs of symmetric speaker groups of the input channels and symmetric speaker groups of the output channels, wherein a decoded significance value indicates if a mixing gain for one or more of the input channels is zero or not;

encoded mixing gains for obtaining the mixing gains, and information indicating in the downmix matrix for each group of the output channels whether a symmetry property and a separability property is are satisfied, wherein the symmetry property indicates that a group of the output channels is mixed with the same gain from a single input channel or that a group of the output channels is mixed equally from a group the input channels and, wherein the separability property indicates that a group of the output channels is mixed from a group of the input channels such that a left input channel is only mapped to a left output channel and a right input channel is only mapped to a right output channel.

11. The decoder of claim 10, wherein the decoder is an audio decoder for decoding an encoded audio signal.

12. The decoder of claim 11, comprising a format converter for receiving the decoded downmix matrix and operative to convert the format of the decoded audio signal in accordance with the received decoded downmix matrix.

13. A new method, comprising:

encoding a downmix matrix, the downmix matrix mapping a plurality of input channels of an audio content to a plurality of output channels, the input channels and the output channels being associated with respective speakers at predetermined positions relative to a listener position, and wherein encoding the downmix matrix comprises exploiting a symmetry of speaker pairs of the plurality of input channels and a symmetry of speaker pairs of the plurality of output channels, wherein respective pairs of the input channels and the output channels in the downmix matrix have associated respective mixing gains for adapting a level by which a given input channel of the input channels contributes to a given output channel of the output channels, and wherein encoding the downmix matrix comprises encoding significance values, wherein respective significance values are assigned to pairs of symmetric speaker groups of the input channels and symmetric speaker groups of the output channels, where in a significance value indicates if mixing gain for one or more of the input channels is zero or not, and wherein encoding the downmix matrix comprises encoding information indicating in the downmix matrix for each group of the output channels whether a symmetry property and a separability property are satisfied, wherein the symmetry property indicates that a group of the output channels is mixed with the same gain from a single input channel or that a group of the output channels is mixed equally from a group of the input channels, and wherein the separability property indicates that a group of the output channels is mixed from a group of the input channels such that a left input channel is only mapped to a left output channel and a right input channel is only mapped to a right output channel.

* * * * *